United States Patent Office 3,362,988
Patented Jan. 9, 1968

3,362,988
ALKANOYLNAPHTHYLOXY-CARBOXYLIC ACIDS
William A. Bolhofer, Frederick, and John J. Baldwin, Lansdale, Pa., assignors to Merck & Co., Inc., Rahway, N.J., a corporation of New Jersey
No Drawing. Filed Aug. 19, 1964, Ser. No. 390,729
11 Claims. (Cl. 260—520)

This application is a continuation-in-part of application Ser. No. 302,484, filed Aug. 15, 1963, now U.S. Patent No. 3,255,242 and also a continuation-in-part of application Ser. No. 152,137, filed Nov. 14, 1961, now abandoned.

This invention relates to a new class of alkanoyl substituted naphthyloxy-carboxylic acids, compounds which exhibit good diuretic activity and which are also useful as chemical intermediates in the preparation of other pharmacologically active products.

Pharmacological studies show that the products of this invention are effective diuretic and saluretic agents and are thus useful in therapy for the treatment of conditions resulting from an excessive retention of electrolytes or fluid within the body as, for example, in the treatment of hypertension, edema and other conditions associated with electroylte and fluid retention. Furthermore, the products of this invention react with the salts of secondary amines in the presence of formaldehyde or paraformaldehyde to produce Mannich amines and the amine salts thus prepared may be treated with a weak base to produce (2-methylenealkanoyl)naphthyloxy-carboxylic acids. The 2-methylene derivatives thus formed also have utility as diuretic and saluretic agents and thus may also be used in the treatment of conditions associated with electrolyte and fluid retention.

The products of the invention are compounds having the following structural formula:

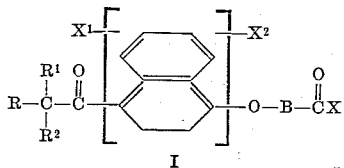

wherein B is a member selected from the group consisting of alkylene, for example, a lower alkylene radical of the formula —$C_nH_{2n}$— wherein $n$ is an integer having a value of 1–5 such as methylene (i.e., —$CH_2$—), ethylene (i.e., —$CH_2$—$CH_2$), ethylidene (i.e., =$CHCH_3$), propylidene (i.e., =$CHC_2H_5$), isopropylidene (i.e., =$C(CH_3)_2$), isobytylidene (i.e., =$CHCH(CH_3)_2$), sec.-pentylidene (i.e., =$C(CH_3)(C_3H_7)$), etc., alkarylene, for example, a lower alkylenephenyl radical of the formula

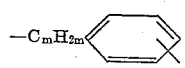

wherein $m$ is an integer having a value of 1–3 as, for example, 1,4-methylenephenyl, 1,3-methylenephenyl, etc., and arylene, for example, a mononuclear arylene such as phenylene, etc.; R is a member selected from the group consisting of an alkyl radical containing from one to six carbon atoms, for example, methyl, ethyl, propyl, isopropyl, butyl, isobutyl, enanthyl, etc., trihalomethyl substituted alkyl, for example, trifluoromethyl substituted lower alkyl such as 1-(trifluoromethyl)ethyl, 2,2,2-trifluoroethyl, etc., cycloalkyl, for example, mononuclear lower cycloalkyl containing from five to about six nuclear carbon atoms such as cyclopentyl, cyclohexyl, 4-methylcyclohexyl, etc., aralkyl, for example, mononuclear lower aralkyl such as benzyl, phenylethyl, etc., aryloxy, for example, mononuclear aryloxy such as phenoxy, naphthoxy, etc., arylthioalkyl, for example, mononuclear arylthio-lower alkyl such as phenylthiomethyl, phenylthioethyl, etc., aralkylthio, for example, mononuclear lower aralkylthio such as benzylthio, phenethylthio, etc. and carboxyalkyl, for example, carboxy-lower alkyl such as carboxymethyl, 2-carboxyethyl, 3-carboxypropyl, etc.; $R^1$ and $R^2$ each represents a member selected from the group consisting of hydrogen, lower alkyl, for example, methyl, ethyl, propyl, etc., and, taken together, the $R^1$ and R radicals may be joined to form a cycloalkyl ring containing from five to six nuclear carbon atoms, for example, cyclopentyl, cyclohexyl, etc.; X is a member selected from the group consisting of hydroxy, lower alkoxy, for example, methoxy, ethoxy, propoxy, etc., and amido, for example, an amido radical of the formula

wherein the $R^3$ radicals can be the same or different members selected from the group consisting of hydrogen and lower alkyl; and $X^1$ and $X^2$ each represent similar or dissimilar members selected from the group consisting of hydrogen, halogen, for example, chlorine, bromine, etc., and lower alkyl, for example, methyl, ethyl, etc.

A preferred embodiment of the invention relates to the alkanoyl-naphthyloxy-alkanoic acids of the following formula:

wherein R is lower alkyl; $X^3$ is a member selected from the group consisting of hydrogen, halogen and lower alkyl; and $n$ is an integer having a value of 1–5. The above class of compounds exhibit particularly good diuretic activity and represent a preferred subgroup of compounds within the scope of this invention.

This invention also relates to the acid addition salts of the instant carboxylic acids, which are prepared by the reaction of the said acids with a base having a non-toxic, pharmacologically acceptable cation. In general, any base which will form an acid addition salt with the instant carboxylic acids and whose pharmacological properties will not cause an adverse physiological effect when ingested by the body system is considered as being within the scope of this invention; suitable bases thus include, for example, the alkali metal and alkaline earth metal hydroxides, carbonates, etc., ammonia, primary, secondary and tertiary amines, such as monoalkylamines, dialkylamines, trialkylamines, nitrogen containing heterocyclic amines, e.g., piperidine, etc. The acid addition salts thus produced are the functional equivalent of the corresponding acid and one skilled in the art will appreciate that to the extent that the carboxylic acids of the invention are useful in therapy the variety of said acid addition salts is limited only by the criterion that the bases employed in forming the said salts be both non-toxic and physiologically acceptable.

The products of the invention may be prepared by any one of a variety of different methods. One method which has proved to be particularly suitable comprises the reaction of an alkanoyl substituted naphthol (III, infra) with an halo substituted carboxylic acid ester, followed by the hydrolysis of the carboxylate intermediate (II, infra) thus formed to the desired alkanoyl-naphthyloxy-carboxylic acid (I). The reaction of the naphthol with the halo-carboxylate is conducted in the presence of a basic reagent as, for example, in the presence of an alkali metal alkoxide, alkali metal carbonate or sodium and, generally, a solvent such as a lower alkanol or N,N-dimethylformamide is employed. Suitable basic reagents which may be used in the process include, for example, sodium methoxide, sodium ethoxide, potassium carbonate, sodium hydride, etc. The reaction is illustrated by the following equation:

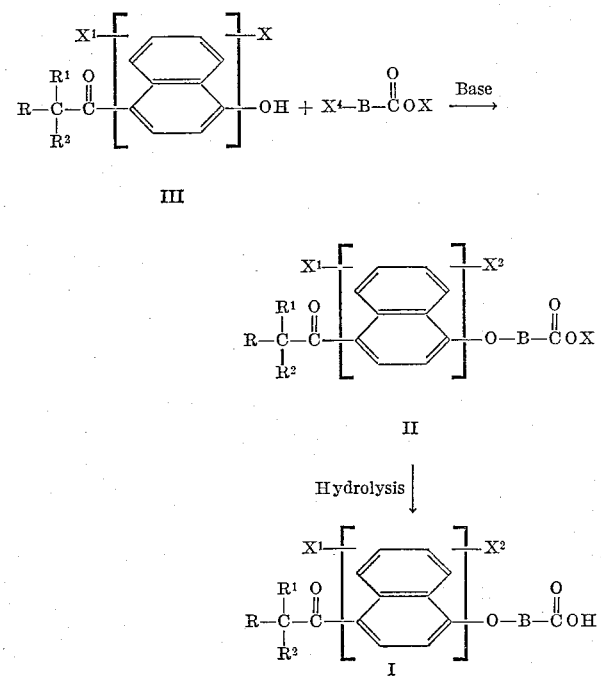

wherein the radicals B, R, R¹, R², X¹ and X² are as defined above, X represents an hydrocarbyl group (i.e., a monovalent organic radical composed solely of carbon and hydrogen) such as lower alkyl, for example, methyl, ethyl, propyl, etc. and X⁴ is halogen, for example, chlorine, bromine, iodine, etc. The saponification step in the above equation is conducted in a conventional manner as, for example, by treatment of the carboxylate intermediate (II) with a base, such as an aqueous solution of an alkali metal hydroxide, e.g., sodium hydroxide, potassium hydroxide, etc., and then with an acid, e.g., hydrochloric acid, to produce the corresponding carboxylic acid (I).

The hydroxy substituted alkanonaphthone starting materials, identified in the above equation as compound III, are conveniently prepared by methods well-known to those having ordinary skill in the art. Thus, a naphthol, or an appropriately substituted derivative thereof, may be acylated by conventional means to produce the desired acylated derivative or, alternatively, an alkoxy-naphthalene compound may be employed as the precursor in an otherwise similar process and the alkoxy-alkanonaphthone thus produced may be converted to the desired hydroxy compound (III).

Specifically, one method for the preparation of the hydroxy-alkanonaphthone compounds (III) comprises treating a naphthol with an alkanoyl halide to produce the corresponding naphthol ester. The ester derivative thus produced is then heated in the presence of aluminum chloride according to the Fries Reaction and a nuclear rearrangement is effected which produces the desired hydroxy-alkanonaphthone (III).

Another method for preparing the hydroxy-alkanonaphthone compounds (III) comprises the reaction of an alkoxy substituted naphthalene with an appropriate alkanoic acid in the presence of boron trifluoride, followed by cleavage of the alkoxy group in the alkoxy substituted alkanonaphthone intermediate thus produced. Agents which are suitable for converting the alkoxy substituted alkanonaphthone intermediate to the desired hydroxy-alkanonaphthone (III) include, for example, pyridine hydrochloride, aluminum chloride and alkyl-magnesium halide, and these are advantageously employed with heating and in the presence of an inert gas.

Still another route for preparing the hydroxy-alkanonaphthone compounds (III) relates to the Friedel-Crafts method of synthesis. Thus, an alkoxy substituted naphthalene compound is reacted with an appropriate alkanoic acid halide in the presence of anhydrous aluminum chloride, preferably in a solvent as, for example, in nitrobenzene, carbon disulfide, hexane, benzene or methylene chloride, to yield the corresponding nuclear alkoxy substituted alkanonaphthone and the alkoxy substituted intermediate thus formed is then cleaved by the method described in the preceding paragraph to produce the desired hydroxy-alkanonaphthone (III).

A modification of the foregoing Friedel-Crafts synthesis comprises treating an acetamido substituted naphthalene compound with alkanoic acid halide in the presence of anhydrous aluminum chloride, followed by acid hydrolysis of the acetamido-alkanonaphthone thus formed to the corresponding amine derivative and diazotization of the said amine with an aqueous sodium nitrite or nitrous acid solution; finally, the diazo intermediate thus produced is hydrolyzed with aqueous sulfuric acid, preferably in an inert atmosphere such as nitrogen, to produce the desired hydroxy-alkanonaphthone (III).

Also, the hydroxy-alkanonaphthones (III) may be prepared by the Grignard reaction of an alkoxy substituted naphthonitrile with an appropriate alkyl magnesium halide, followed by hydrolysis of the alkoxy substituted naphthylimino intermediate thus formed with an aqueous ammonium chloride solution and conversion of the alkoxy substituted alkanonaphthone thus obtained to the desired hydroxy analog (III) as, for example, by treatment of the said alkoxy derivative with pyridine hydrochloride or with any of the other aforementioned reagents suitable for converting the alkoxy intermediates to their hydroxy derivatives (III).

Still another method for preparing the hydroxy-alkanonaphthones (III) comprises the treatment of a methoxy substituted halonaphthalene with a suspension of magnesium metal and iodine in an inert solvent, followed by the reaction of the complex thus formed with an appropriate alkylnitrile; the imino intermediate thus prepared is then hydrolyzed in an aqueous ammonium chloride solution to its alkoxy-alkanonaphthone and the said alkoxy derivative is converted to the desired hydroxy derivative (III) by conventional means. Alternatively, the naphthalene-Grignard complex, prepared as described above, may be reacted with an appropriate alkanal to produce an alpha-hydroxy substituted alkyl-naphthalene and the hydroxy derivative thus prepared is oxidized by treatment with a pyridine-chromium trioxide reagent to produce the desired alkoxy-alkanonaphthone which can then be converted to the desired hydroxy analog (III) by the method described above.

Finally, when the hydroxy-alkanonaphthone (III) is an 8-hydroxy-1-alkanonaphthone or a 3-hydroxy-2-alkanonaphthone, the said starting material is prepared by the condensation of an appropriately substituted alkoxy-naphthoic acid, such as an 8-methoxy-1-naphthoic acid or 3-methoxy-1-naphthoic acid, with thionyl chloride; the naphthoyl chloride thus produced is then treated with a cadmium alkyl in a suitable solvent (e.g., in benzene), subjected to reflux for a short interval and treated with a dilute aqueous solution of sulfuric acid to yield the corresponding 8-methoxy-1-alkanonaphthone or 3-methoxy-1-alkanonaphthone derivative. The methoxy derivative thus produced is then converted by conventional means as, for example, by treatment with aluminum chloride or by treatment with boron tribromide to produce the desired hydroxy substituted 1-alkanonaphthone.

A second method for preparing the alkanoyl substituted naphthyloxy carboxylic acids (I) of this invention comprises treating a naphthyloxy-carboxylic acid of the Formula IV, infra, with a suitable acid halide in the presence of a metallic halide according to the Friedel-Crafts method of synthesis. The following equation illustrates the reaction:

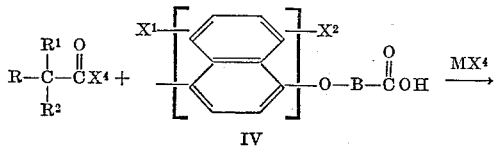

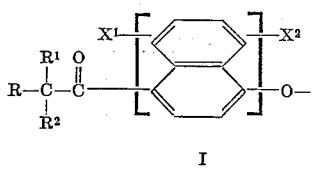

wherein the radicals B, R, $R^1$, $R^2$, $X^1$, $X^2$ and $X^4$ are as defined above and $MX^4$ represents a metallic halide. The metallic halides act as catalysts in the condensation of the acid halide with the naphthyloxy-carboxylic acid compound (IV) and include, for example, anhydrous aluminum chloride and boron trifluoride. The reaction solvent and the temperature at which the condensation is conducted are not particularly critical inasmuch as any solvent which is inert to the acid halide and naphthyloxy-carboxylic acid reactants and the metallic halide catalyst may be employed with good results and the reaction temperature may be varied to obtain the desired rate of reaction. However, carbon disulfide is a particularly suitable solvent in which to conduct the reaction and, generally, it is most desirable to conduct the synthesis with slight heating as, for example, at reflux temperatures by heating on a steam bath.

Those arylalkanoyl substituted naphthyloxy-carboxylic acids corresponding to Formula I, supra, wherein R represents aralkyl, are conveniently prepared by the condensation of an alkanoyl substituted naphthyloxy-carboxylic acid, having the Formula V, infra, with an araldehyde followed by hydrogenation of the arylacryloyl-naphthyloxy-carboxylic acid (VI) thus produced to the desired product (I). The following equation, wherein the araldehyde is benzaldehyde, illustrates the process; other araldehydes such as α-phenylacetaldehyde, etc. may also be employed in a similar manner to obtain the desired aralkyl substituted product:

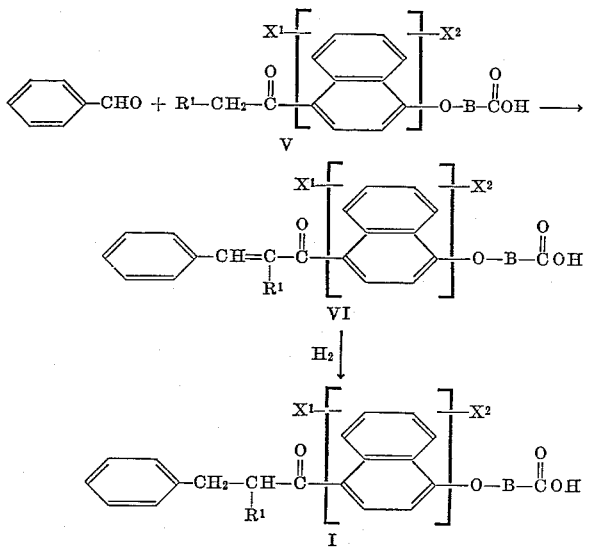

wherein the radicals B, $R^1$, $X^1$ and $X^2$ are as defined above. Hydrogenation in the presence of palladium on charcoal and in the presence of an alcohol, such as isopropyl alcohol, is a particularly advantageous method by which to reduce the alkylidene group of compound VI to its corresponding phenylalkanoyl analog (I). However, any one of variety of other reductants well-known to those skilled in the art may also be employed in a similar manner to achieve the desired result.

The oxy and thio substituted alkanoyl-naphthyloxy-carboxylic acid products corresponding to Formula I, supra, wherein R represents an aryloxy, an arylthioalkyl or an aralkylthio radical are prepared by treating an haloalkanoyl-naphthyloxy-carboxylic acid with an appropriate phenol, naphthol, thiophenol, benzylmercaptan, etc., in the presence of a base as, for example, in the presence of an aqueous solution of potassium hydroxide or sodium hydroxide. Generally, the reaction may be conducted in any suitable inert solvent but preferably an alcoholic medium such as methanol, ethanol, etc., is employed. The haloalkanoyl-naphthyloxy-carboxylic acids employed as reactants in the process are prepared by any one of several methods but one route which has proved particularly advantageous is the Friedel-Crafts reaction of a naphthyloxy-carboxylic acid with an appropriate halo substituted alkanoyl halide, for example, an omega-chlorobutyryl chloride, chloroacetyl chloride, etc., in the presence of anhydrous aluminum chloride.

The presence of a lower alkyl substituent at the 5 position of the naphthol (III) or naphthyloxy-carboxylic acid (IV) reactant makes it extremely difficult to prepare the 5-alkyl substituted products of this invention by either of the aforementioned etherification or acylation (i.e., Friedel-Crafts) processes. Therefore, we have found it necessary to produce the said 5-alkyl derivatives by a circuitous route which involves the use of dihydro and tetrahydro derivatives of naphthalene and aromatization of the polyhydro derivatives thus employed to their corresponding naphthalene analogs. Specifically, this method of preparation comprises the reaction of an alkanoyloxy-3,4-dihydro-1(2H)-napthalenone with magnesium and an alkyl iodide to produce an 1-hydroxy-1-alkyl-1,2,3,4-tetrahydro-5-naphthol followed by etherification of the said naphthol by treatment with an alkyl haloalkanoate in the presence of an alkali metal alkoxide to produce the corresponding alkyl (5-hydroxy-5-alkyl-5,6,7,8-tetrahydro-1-naphthyloxy)alkanoate; the alkanoate derivative thus formed is then dehydrated to the corresponding alkyl (7,8-dihydro-5-alkyl-1-naphthyloxy)alkanoate, hydrogenated to its alkyl (5,6,7,8-tetrahydro-5-alkyl-1-naphthyloxy)alkanoate derivative, saponified to produce the corresponding alkanoic acid and then treated with an alkanoyl-halide to yield a 4 - alkanoyl-5-alkyl-5,6,7,8-tetrahydro-1-naphthyloxy alkanoic acid; the said acid is then esterified by conventional means, aromatized with a suitable reagent as, for example, with 2,3-dichloro-5,6-dicyano-1,4-benzoquinone in benzene and, if desired, saponified to its corresponding carboxylic acid by treatment with an aqueous solution of hydrochloric acid.

The ester and amide derivatives of the instant alkanoyl substituted naphthyloxy-carboxylic acids (I) are prepared by conventional methods well-known to those skilled in the art; thus, for example, the said ester derivatives may be prepared by the reaction of the acid products of the invention with an alcohol as, for example, with a lower alkanol to prepare the corresponding ester or, alternatively, converting the carboxylic acid product to its acid halide by conventional methods and treating the acid halide thus formed with an appropriate lower alkanol. Similarly, the amide derivatives of the instant carboxylic acid products (I) may be prepared by treating an acid halide of the instant acids with ammonia or an appropriate alkylamine or dialkylamine to produce the corresponding amide. The ester derivatives of the alkanoic acids of the invention may also be prepared inherently during the process by employing the ester analogs of the corresponding haloalkanoic acid reactants described in the preparative method discussed above. These and other equivalent methods for the preparation of the ester and amide derivatives of the instant carboxylic acids will be apparent to one having ordinary skill in the art and, to the extent that the said derivatives are both non-toxic and physiologically acceptable to the body system, the said esters and amides are the functional equivalent of the corresponding carboxylic acids per se.

The alkanoyl substituted naphthyloxy- carboxylic acids of the invention are generally obtained as crystalline solids and, if desired, may be purified by recrystallization from a solvent. Suitable solvents include, for example, ethanol, isopropyl alcohol, cyclohexane, hexane, benzene and mixtures thereof such as a mixture of ethanol in water, benzene in cyclohexane, benzene and hexane, benzene and methanol and isopropyl alcohol and water.

The products of the invention exhibit diuretic, natriuretic and chloruretic properties and, therefore, are useful as pharmaceuticals in the treatment of ailments resulting from an excessive retention of electrolytes in the body, especially sodium, chloride or sodium and chloride ions.

In addition, the products of the invention are highly valuable chemical intermediates which may be converted to their corresponding (2-methylenealkanoyl)-naphthyloxy-carboxylic acid compounds by the method described in copending application Ser. No. 302,484 filed Aug. 15, 1963, of which the instant application is a continuation-in-part. The said (2-methylenealkanoyl)-napthyloxy-carboxylic acids are also useful as diuretic and saluretic agents and are characterized by a rapid and marked removal of electrolyte with no danger of excessive electrolyte depletion.

The examples which follow illustrate the method of preparing the alkanoyl substituted naphthyloxy-carboxylic acids of the invention as well as the intermediates necessary to their preparation. However, the examples are illustrative only and it will be apparent to one having ordinary skill that all of the products embraced by Formula I, supra, may also be prepared in an analogous manner by substituting the appropriate starting materials for those set forth in the examples.

EXAMPLE 1

*(5-butyryl-1-naphthyloxy)acetic acid*

STEP A.—5-METHOXY-1-NAPHTHONITRILE

To a well-stirred solution of 48.2 g. (0.285 mole) of 5-hydroxy-1-naphthonitrile in 250 ml. of 2 N potassium hydroxide, there is added 26.5 ml. (0.285 mole) of methyl sulfate over a one-minute period. A warming effect is observed and solid product begins to separate. After 5 minutes, additional methyl sulfate (13.3 ml., 0.142 mole) is added, the mixture becomes acidic and additional 2 N potassium hydroxide is added to maintain alkalinity. After 15 minutes the solid product is collected, washed with water and dried. The crystalline product is dissolved in 550 ml. of hot isopropyl ether, the solution filtered and then concentrated to 200 ml. After crystallization at 0° C., 30.0 g. of 5-methoxy-1-naphthonitrile is collected, M.P. 87–89° C.

Analysis for: $C_{12}H_9NO$.—Calculated: C, 78.67; H, 4.95; N, 7.65. Found: C, 78.52; H, 4.72; N, 7.85.

STEP B.—5-METHOXY-1-BUTYRONAPHTHONE

A Grignard reagent is prepared from 0.248 mole of magnesium and 0.248 mole of n-propyl bromide in 325 ml. of ether. To the vigorously stirred, refluxing solution of the Grignard reagent, a solution of 41.2 g. (0.225 mole) of 5-methoxy-1-naphthonitrile in 450 ml. of ether is added over a ten minute period. The reflux condenser is changed for downward distillation and 550 ml. of toluene is added at a rate equal to that of the ether being removed by distillation. After all the toluene has been added, distillation is continued until the vapor temperature reached 109° C. The downward condenser is replaced by an upright condenser and refluxing continued for four hours. The mixture is cooled to room temperature and 250 ml. of saturated ammonium chloride solution added. The toluene phase is separated and the aqueous phase extracted with ether which is then combined with the toluene. The combined solvent extracts are extracted with 400 and 200 ml. portions of 1 N sulfuric acid. The acid extracts are combined and allowed to stand at 20° C. After 18 hours, crystalline 5-methoxy - 1 - butyronaphthone is collected, washed with water and dried, yield 46.0 g. After recrystallization from isopropyl ether, the product melts at 67–69° C.

Analysis for: $C_{15}H_{16}O_2$.—Calculated: C, 78.92; H, 7.06. Found: C, 78.87; H, 7.00.

STEP C.—5-HYDROXY-1-BUTYRONAPHTHONE

Ten grams of 5-methoxy-1-butyronaphthone and 30 g. of pyridine hydrochloride are heated at 200–210° C. for 1 hour with stirring in a nitrogen atmosphere. After the reaction cools to 20° C. the cake is dissolved with a mixture of 100 ml. of 1 N hydrochloric acid and 100 ml. of ether. The ether layer is separated, extracted with water and then the naphthol is extracted into 75 ml. of 1 N sodium hydroxide. Dissolved ether is removed from the alkaline solution by bubbling a stream of nitrogen through it. A limited amount of 1 N hydrochloric acid is added to precipitate the tarry by-products. The mixture then is filtered, the filtrate acidified and the solid material collected and washed with water, yielding 7.4 g. of crystalline 5-hydroxy-1-butyronaphthone, M.P. 83–85° C. After recrystallization from a mixture of benzene and hexane the product melts at 84–86° C.

Analysis for: $C_{14}H_{14}O_2$.—Calculated: C, 78.48; H, 6.59. Found: C, 78.76; H, 6.68.

STEP D.—(5-BUTYRYL-1-NAPHTHYLOXY)ACETIC ACID 5-hydroxy-1-butyronaphthone (17.7 g., 0.0825 mole) is added to a solution of 0.0867 mole of sodium ethoxide in 250 ml. of ethyl alcohol. A dark solution results, to which is added 16.6 g. (0.099 mole) of ethyl bromoacetate. The solution is heated under reflux for three hours and then 115 ml. of 1 N sodium hydroxide is added. Refluxing is continued for 20 minutes and then the ethyl alcohol is removed by vacuum concentration. The residual aqueous solution is treated with decolorizing charcoal. The filtrate is acidified with 1 N hydrochloric acid and the crystalline (5-butyryl-1-naphthyloxy)acetic acid collected, washed with water and dried to yield 19.0 g. of (5-butyryl-1-naphthyloxy)acetic acid. Recrystallization from isopropyl alcohol gives material melting at 156–157.5° C.

Analysis for: $C_{16}H_{16}O_4$.—Calculated: C, 70.57; H, 5.92. Found: C, 70.40; H, 6.07.

EXAMPLE 2

*Ethyl (4-isovaleryl-1-naphthyloxy)acetate*

STEP A.—4-METHOXY-1-ISOVALERONAPHTHONE

A solution of 158 g. (1 mole) of 1-methoxynaphthalene and 204 g. (2 moles) of isovaleric acid at 0° C. is saturated with boron trifluoride. The dark red mixture then is heated to 75° C. and maintained at that temperature for 6 hours, the reaction mixture then is poured onto a mixture of 500 g. of ice, 500 g. of water and 500 g. of sodium acetate whereupon an oil separates and is extracted with ether. The ethereal extract is dried over sodium sulfate and the solvent removed. The residue is distilled under reduced pressure, the distillate solidifies and is recrystallized from hexane yielding 175 g. of 4-methoxy-1-isovaleronaphthone, M.P. 59.5–61.5° C.

Analysis for: $C_{16}H_{18}O_2$.—Calculated: C, 79.31; H, 7.49. Found: C, 79.02; H, 7.34.

STEP B.—4-HYDROXY-1-ISOVALERONAPHTHONE

A mixture of 10 g. of 4-methoxy-1-isovaleronaphthone and 20 g. of pyridine hydrochloride is heated at 205° C.

for 1 hour. After cooling to 80° C. the mixture is suspended in 200 ml. of 10% hydrochloric acid. A dark oil separates and is extracted with ether and the ethereal solution extracted with 10% aqueous sodium hydroxide. Acidification of the alkaline extract with hydrochloric acid results in the precipitation of a solid which, after recrystallization from a 1:1 mixture of benzene and hexane, yields 2 g. of 4-hydroxy - 1 - isovaleronaphthone, M.P. 133–135° C.

Analysis for: $C_{15}H_{18}O_2$.—Calculated: C, 78.92; H, 7.06. Found: C, 78.93; H, 7.00.

STEP C.—ETHYL (4-ISOVALERYL-1-NAPHTHYLOXY) ACETATE 4-hydroxy-1-isovaleronaphthone (9.1 g., 0.04 mole) is added to a solution of 130 ml. of absolute ethanol containing 0.048 mole of sodium ethoxide. After stirring for 10 min., 8 g. (0.048 mole) of ethyl bromoacetate is added. After refluxing for 17 hours, the reaction mixture is filtered to remove salt, and the ethanol is then removed under reduced pressure. The residue is crystallized from hexane and yields 8.5 g. of ethyl (4-isovaleryl-1-naphthyloxy)acetate, M.P. 57–59° C.

Analysis for: $C_{19}H_{22}O_4$.—Calculated: C, 72.59; H, 7.05. Found: C, 72.29; H, 7.00.

The ethyl (4-isovaleryl-1-naphthyloxy)acetate obtained as described above may then be converted to the corresponding acid, if desired, by suspending the said ethyl ester in 100 ml. of 2 N sodium hydroxide containing 30 ml. of ethanol, refluxing the mixture for one hour, cooling and acidifying with hydrochloric acid. The resulting precipitate is then filtered and recrystallized from a mixture of benzene and hexane to yield (4-isovaleryl-1-naphthyloxy)acetic acid, melting at 120–121.5° C.

Alternatively, the (4-isovaleryl - 1 - naphthyloxy)acetic acid may also be prepared by the procedure described in Example 21.

EXAMPLE 3

(5-methyl-7-butyryl-1-naphthyloxy)acetic acid

STEP A.—8-METHOXY-4-METHYL-2-BUTYRONAPHTHONE

A solution of 2.0 g. (0.012 mole) of 1-methoxy-5-methylnaphthalene in 4.0 g. (0.046 mole) of butyric acid is saturated with boron trifluoride at 10° C. The solution is treated by substantially the same method described in Example 2, Step A, yielding 2.62 g. of a viscous yellow liquid which is a mixture of 80% of 8-methoxy-4-methyl-2-butyronaphthone and 20% of other isomers.

STEP B.—8-HYDROXY-4-METHYL-2-BUTYRONAPHTHONE

A mixture of 5.0 g. (2.021 mole) of the above mixture of isomers and 15.0 g. (0.13 mole) of pyridine hydrochloride is treated substantially as described in Example 1, Step C, to give 2.32 g. of a brown solid which is crude 8-hydroxy-4-methyl - 2 - butyronaphthone (the other isomers remain in the organic solvent upon treatment with alkali). Recrystallization twice from aqueous isopropyl alcohol gives pure 8-hydroxy-4 - methyl - 2 - butyronaphthone, M.P. 178–180° C.

Analysis for: $C_{15}H_{16}O_2$.—Calculated: C, 78.92; H, 7.06. Found: C, 78.58; H, 7.35.

STEP C.—(5-METHYL-7-BUTYRYL-1-NAPHTHYLOXY) ACETIC ACID 8-hydroxy-4-methyl-2-butyronaphthone (1.0 g., 0.0044 mole) is added to a solution of 35 ml. of absolute ethanol containing 0.0053 mole of sodium ethoxide and then 0.88 g. (0.0053 mole) of ethyl bromoacetate is added and the solution is treated in essentially the same manner described in Example 1, Step D, to give 1.04 g. of a brown solid. Repeated crystallization from a mixture of benzene and cyclohexane gives (5-methyl-7-butyryl-1-naphthyloxy)acetic acid in the form of a white solid, M.P. 152.5–154° C.

Analysis for: $C_{17}H_{16}O_4$.—Calculated: C, 71.31; H, 6.34. Found: C, 71.06; H, 6.47.

EXAMPLE 4

(8-butyryl-2-naphthyloxy)acetic acid

STEP A.—7-AMINO-1-BUTYRONAPHTHONE HYDROCHLORIDE 2-acetamidonaphthalene, (18.5 g., 0.1 mole), aluminum chloride 167 g. (0.5 mole) and 400 cc. carbon disulfide are mixed and stirred rapidly with a Hershberg stirrer. The mixture is cooled to 0° C. and 13.3 g. (0.125 mole) butyryl chloride added during 20 minutes. The mixture changes from colorless to yellow and at the end of the addition a gum-oil separates. This mixture is stirred at 0° C. for 3 hours, then stirred 1 hour as the mixture slowly comes to room temperature. After standing at room temperature overnight, hydrogen chloride is expelled by stirring and heating on a steam bath for 1 hour. After cooling to room temperature, the upper carbon disulfide layer is removed and 300 g. of ice added slowly to the stirred residue. After stirring ½ hour, 100 ml. concentrated hydrochloric acid is added and this mixture then is stirred and heated on a steam bath 1½ hours. On cooling, an oil solidifies and is collected by filtration. The thus obtained yellow 7-amino-1-butyronaphthone hydrochloride is triturated twice with isopropyl ether to yield 24 g. (94%), of product, M.P. 163–170° C. One recrystallization from alcohol raises the M.P. to 177–181° C.

Analysis for: $C_{14}H_{15}NO \cdot HCl$.— Calculated: C, 67.32; H, 6.46; N, 5.61. Found: C, 67.17; H, 6.55; N, 5.55.

STEP B.—7-HYDROXY-1-BUTYRONAPHTHONE 7-amino - 1 - butyronaphthone hydrochloride (10.0 g., 0.04 mole) is dissolved in a mixture of 10 ml. of glacial acetic acid, 10 ml. of concentrated sulfuric acid and 30 ml. of water. This solution is cooled to 0° C. and 3.3 g. (0.048 mole) of sodium nitrite in 10 ml. of water is added slowly keeping the temperature below 5° C. This diazo solution is left at 0° C. for 15 minutes and then added dropwise over 7 minutes to a stirred, refluxing mixture of 40 ml. of concentrated sulfuric acid and 160 ml. of water in a nitrogen atmosphere. The mixture is stirred and refluxed three minutes and then immediately poured over 400 g. of crushed ice. After 1 hour, the dark gum is repeatedly extracted with portions of boiling hexane which, on cooling, precipitates 3.25 g. (38%) of 7-hydroxy-1-butyronaphthone as yellow rosettes, M.P. 79–83° C. An additional recrystallization (with charcoal) from hexane raises the M.P. to 84–85° C.

Analysis for: $C_{14}H_{14}O_2$.—Calculated: C, 78.48; H, 6.59. Found: C, 78.49; H, 6.67.

STEP C.—(8-BUTYRYL-2-NAPHTHYLOXY)ACETIC ACID 7-hydroxy-1-butyronaphthone (2.14 g., 0.01 mole) is dissolved in 35 ml. of absolute ethanol containing 0.012 mole sodium ethoxide. After this solution has refluxed for 10 minutes, 3.3 g. ethyl bromoacetate (0.02 mole) is added and the solution then is treated by substantially the same method described in Example 1, Step D, to give a precipitated oil which is scratched and solidified to yield 2.6 g. (97%) of (8-butyryl-2-naphthyloxy)acetic acid as a light yellow solid, M.P. 109–115° C. Recrystallization from a 2:1 mixture of benzene and cyclohexane increases the M.P. to 118–120° C.

Analysis for: $C_{16}H_{16}O_4$.—Calculated: C, 70.57; H, 5.92. Found: C, 70.82; H, 6.11.

EXAMPLE 5

(4-chloro-2-butyryl-1-naphthyloxy)acetic acid

STEP A.—4-CHLORO-1-HYDROXY-2-BUTYRO-NAPHTHONE

To a solution of 10.7 g. (0.05 mole) of 1-hydroxy-2-butyronaphthone in 200 ml. of glacial acetic acid is added dropwise 5.4 g. (0.05 mole) of tert.-butylhypochlorite. The reaction mixture is held at 100° C. for forty-five minutes and then poured into 300 ml. of water. An oil separates, which solidifies and is removed by filtration. Recrystallization from hexane yields 6.5 g. of 4-chloro-1-hydroxy-2-butyronaphthone, M.P. 59.5–61° C.

Analysis for: $C_{14}H_{13}ClO_2$.—Calculated: C, 67.61; H, 5.27. Found: C, 67.33; H, 5.36.

STEP B.—(4-CHLORO-2-BUTYRYL-1-NAPHTHYLOXY) ACETIC ACID

A mixture of 8 g. (0.032 mole) of 4-chloro-1-hydroxy-2-butyronaphthone, 10.5 g. (0.076 mole) of potassium carbonate, 6.3 g. (0.038 mole) of ethyl bromoacetate and 100 ml. of N,N-dimethylformamide is stirred at room temperature for 17 hours. Water is added until all the inorganic salts have dissolved and the solution then is extracted with ether. The ether layer is separated and the solvent removed. The resulting dark oil is suspended in 100 ml. of 2 N aqueous potassium hydroxide. The mixture is boiled for forty-five minutes, acidified with hydrochloric acid and extracted with ether. The ether solution is extracted with aqueous sodium bicarbonate, and the bicarbonate extract then is acidified whereupon a solid separates. Recrystallization from a mixture of benzene and hexane yields 4 g. of (4-chloro-2-butyryl-1-naphthyloxy)acetic acid, M.P. 74–76° C.

Analysis for: $C_{16}H_{15}ClO_4$.—Calculated: C, 62.65; H, 4.93. Found: C, 62.38; H, 5.10.

EXAMPLE 6

(2-chloro-4-butyryl-1-naphthyloxy)acetic acid

STEP A.—3-CHLORO-4-HYDROXY-1-BUTYRO-NAPHTHONE

Aluminum chloride, 26.6 g., is added to a mixture of 17.8 g. (0.1 mole) of 2-chloro-1-naphthol, 10.6 g. (0.1 mole) of butyryl chloride and 200 ml. of nitrobenzene. The resulting black solution is allowed to stir for 20 hours at room temperature and the reaction mixture then is poured onto a mixture of 100 g. of ice, 100 g. of water and 100 g. of concentrated hydrochloric acid. The organic layer is diluted with 200 ml. of ether, separated from the aqueous layer, and then extracted with 20% aqueous sodium hydroxide. Acidification of the alkaline extract yields a dark solid which, after recrystallization from a mixture of benzene and hexane gives 5.5 g. of 3-chloro-4-hydroxy-1-butyronaphthone, M.P. 111–113° C.

Analysis for: $C_{14}H_{13}ClO_2$.—Calculated: C, 67.61; H, 5.27. Found: C, 67.79; H, 5.38.

STEP B.—(2-CHLORO-4-BUTYRYL-1-NAPHTHYLOXY) ACETIC ACID

To a solution of 5 g. (0.02 mole) of 3-chloro-4-hydroxy-1-butyronaphthone in 100 ml. of absolute ethanol there is added 0.22 mole of sodium hydride. After stirring for ten minutes, 3.33 g. (0.022 mole) of ethyl bromoacetate is added to the clear solution and the reaction mixture is treated in substantially the same manner described in Example 1, Step D, whereupon the product precipitates. After recrystallization from benzene, 3 g. of (2-chloro-4-butyryl-1-naphthyloxy)acetic acid is obtained, M.P. 124–125° C.

Analysis for: $C_{16}H_{15}ClO_4$.—Calculated: C, 62.65; H, 4.93. Found: C, 62.77; H, 5.02.

EXAMPLE 7

(5-butyryl-2-naphthyloxy)acetic acid

STEP A.—6-METHOXY-1-BUTYRONAPHTHONE

In a 2 liter three-necked flask fitted with a stirrer, reflux condenser, drying tube, dropping funnel and heating mantle, there is placed 19.5 g. (0.8 mole) of magnesium turnings. Fifty ml. of ether, a crystal of iodine and 1 ml. of ethylene dibromide then are added. As soon as the vigorous reaction begins, a solution of 114 g. (0.4 mole) of 6-methoxy-1-iodonaphthalene in 570 ml. of anhydrous ether is added over a 40 minute period. The mixture then is heated under reflux with stirring for one hour and then a solution of 55.2 g. (0.8 mole) of butyronitrile in 300 ml. of ether is added over a 45 minute period and refluxing and stirring continued for 3 hours. The reaction then is cooled to 10° C. and 500 ml. of ammonium chloride solution added. After vigorous agitation, the ether layer is separated and extracted with a 600 ml. and two 200 ml. portions of 1 N sulfuric acid. The acid extracts are combined and heated at 80° C. for one hour whereupon an oily product separates and is extracted into ether. The ether solution is washed with water, dried with sodium sulfate and then concentrated in vacuo to give 54 g. of 6-methoxy-1-butyronaphthone as a light yellow oil, $n_D^{25}$ 1.6010, which is purified by evaporative distillation at 140–145° C. and 0.05 mm. pressure.

Analysis for: $C_{15}H_{16}O_2$.—Calculated: C, 78.92; H, 7.05. Found: C, 79.06; H, 7.07.

STEP B.—6-HYDROXY-1-BUTYRONAPHTHONE

Eight grams of 6-methoxybutyronaphthone and 24 grams of pyridine hydrochloride are treated by substantially the same method described in Step C of Example 1 to give 7.0 g. of 6-hydroxy-1-butyronaphthone. Recrystallization of the product from n-butyl chloride gives material melting at 83–84° C.

Analysis for: $C_{14}H_{14}O_2$.—Calculated: C, 78.48; H, 6.59. Found: C, 78.14; H, 6.73.

STEP C.—(5-BUTYRYL-2-NAPHTHYLOXY)ACETIC ACID 6-hydroxy-1-butyronaphthone (19.3 g., 0.09 mole) is added to a solution of 0.095 mole of sodium ethoxide in 300 ml. of ethyl alcohol. A clear solution results to which is added 18.03 g. (0.108 mole) of ethyl bromoacetate. The solution is treated by substantially the same method described in Example 1, Step D. The product obtained is recrystallized from benzene to provide 17.2 g. of (5-butyryl-2-naphthyloxy)acetic acid, M.P. 113–115° C.

Analysis for: $C_{16}H_{16}O_4$.—Calculated: C, 70.57; H, 5.92. Found: C, 70.62; H, 6.06.

EXAMPLE 8

(2-methyl-4-butyryl-1-naphthyloxy)acetic acid

STEP A.—(2-METHYL-1-NAPHTHYLOXY)ACETIC ACID 2-methyl-1-naphthol (10.0 g., 0.063 mole) is dissolved in 200 cc. absolute ethyl alcohol containing 0.0788 mole of sodium ethoxide and the solution treated by substantially the same method described in Example 1, Step D. The brown oil which separates soon solidifies and after recrystallization from 100 ml. benzene, gives 10.0 g. of (2-methyl-1-naphthyloxy)acetic acid, M.P. 141–143° C.

Analysis for: $C_{13}H_{12}O_3$.—Calculated: C, 72.21; H, 5.59. Found: C, 72.29; H, 5.60.

STEP B.—(2-METHYL-4-BUTYRYL-1-NAPHTHYLOXY) ACETIC ACID (2-methyl-1-naphthyloxy)acetic acid (6.5 g., 0.03 mole) is dissolved in 60 ml. of carbon disulfide. This solution is stirred and 12.0 g. (0.09 mole) aluminum chloride is added and then 3.5 g. (0.033 mole) of n-butyryl chloride is added. The mixture is stirred at room temperature for 1 hour, then stirred under reflux 3 hours. After cooling to room temperature, 50 ml. of a mixture of ice and water is added and then acidified with 2½ N hydrochloric acid. The oily product is extracted into ether. The ethereal solution is dried over sodium sulfate and filtered through Filter-Cel and charcoal, then concentrated, yielding 8.7 g. of a red oil. The oil is dissolved in 30 ml. of a 1:1 mixture of benzene-cyclohexane and cooled to yield 5.1 g. of a light pink solid, M.P. 114–117° C. Recrystallization from benzene gives (2-methyl-4-butyryl-1-naphthyloxy)acetic acid, M.P. 116–119° C.

Analysis for: $C_{17}H_{18}O_4$.—Calculated: C, 71.31; H, 6.34. Found: C, 71.34; H, 6.25.

EXAMPLE 9

(6-propionyl-2-naphthyloxy)acetic acid

Three grams (0.015 mole) of 6-hydroxy-2-propionaphthone is dissolved in 100 ml. of warm isopropyl alcohol and to this clear solution is added 0.019 mole sodium hydride and then 0.019 mole ethyl bromoacetate. This solution then is treated by substantially the same method described in Example 1, Step D, to give (6-propionyl-2-naphthyloxy)acetic acid which is collected by filtration, washed with water and dried. After recrystallization from alcohol, the product melts at 175–177° C.

Analysis for: $C_{15}H_{14}O_4$.—Calculated: C, 69.75; H, 5.46. Found: C, 69.45; H, 5.62.

EXAMPLE 10

(4-propionyl-1-naphthyloxy)acetic acid

To 300 ml. of isopropyl alcohol there is added 0.11 mole of sodium hydride and then 20.0 g. (0.1 mole) of 4-hydroxy-1-propionaphthone. A homogeneous solution results to which is added 18.37 g. (0.11 mole) of ethyl bromoacetate and the reaction is carried out in substantially the same manner as described in Example 1, Step D, to yield 7.6 g. of (4-propionyl-1-naphthyloxy)acetic acid, M.P. 189–191° C. Recrystallization from isopropyl alcohol raises the M.P. to 190–193° C.

Analysis for: $C_{15}H_{14}O_4$.—Calculated: C, 69.75; H, 5.46. Found: C, 69.32; H, 5.69.

EXAMPLE 11

(4-butyryl-1-naphthyloxy)acetic acid

To a solution of 27.2 g. (0.134 mole) (1-naphthyloxy) acetic acid in 200 ml. carbon disulfide is added 15.8 g. (0.148 mole) n-butyryl chloride. The solution is cooled to 0° C. and 50.8 g. (0.38 mole) aluminum chloride (anhydrous) is added over 15 minutes and the reaction then carried out in substantially the same manner described in Example 8, Step B. A solid precipitate is obtained, filtered and washed well with water. The solid, (4-butyryl-1-naphthyloxy)acetic acid is dissolved in 300 ml. of benzene and filtered through diatomaceous earth and charcoal and cooled and collected to yield 37 g. of a yellow solid, M.P. 125–132° C. After recrystallization from 75% alcohol, the (4-butyryl-1-naphthyloxy)acetic acid melts at 137–139° C.

Analysis for: $C_{16}H_{16}O_4$.—Calculated: C, 70.57; H, 5.92. Found: C, 70.41; H, 6.03.

EXAMPLE 12

[4-(α-ethylbutyryl)-1-naphthyloxy]acetic acid

To a well stirred, cooled mixture of 25.2 g. (0.125 mole) of (1-naphthyloxy)acetic acid and 16.7 g. (0.14 mole) of α-ethylbutyryl chloride in 500 ml. of carbon disulfide, there is added 53.2 g. (0.4 mole) of aluminum chloride. The mixture is treated by substantially the same method described in Example 8, Step B, to give a solid which separates and upon recrystallization from a mixture of benzene and hexane yields 12 g. of [4-(α-ethylbutyryl)-1-naphthyloxy]acetic acid, melting point 111.5–112.5° C.

Analysis for: $C_{18}H_{20}O_4$.—Calculated: C, 71.98; H, 6.71. Found: C, 71.90; H, 6.75.

EXAMPLE 13

(4-butyryl-2-naphthyloxy)acetic acid

STEP A.—3-METHOXY-1-BUTYRONAPHTHONE

A Grignard reagent is prepared from 1.85 g. (0.076 mole) magnesium turnings and 9.4 g. (0.076 mole) n-propyl bromide in 100 ml. absolute ether. After the reagent has refluxed and stirred for 1 hour, 3-methoxy-1-cyanonaphthalene (11.6 g., 0.0635 mole) dissolved in 500 ml. of ether is added slowly. The reaction of these materials is carried out substantially as described in Example 1, Step B, to yield 8.3 g. of 3-methoxy-1-butyronaphthone as a brown oil, $n_D^{20}$ 1.5980. Evaporative distillation produces a slightly yellow oil sample with an evaporative boiling point of 140° C. at 0.1 mm. pressure, $n_D^{20}$ 1.5986.

Analysis for: $C_{15}H_{16}O_2$.—Calculated: C, 78.92; H, 7.06. Found: C, 78.94; H, 6.98.

STEP B.—3-HYDROXY-1-BUTYRONAPHTHONE

Pyridine (40 ml., 0.5 mole) and concentrated hydrochloric acid (44 ml., 0.5 mole) are cautiously mixed in a round-bottomed flask and heated to 210° C. in a metal bath. To this molten anhydrous pyridine hydrochloride is added 11.8 g. (0.052 mole) of 3-methoxy-1-butyronaphthone and the solution is then treated by substantially the same method as described in Example 1, Step C, to yield 8.9 g. of 3-hydroxy-1-butyronaphthone, M.P. 115–118° C. Recrystallization from n-butyl chloride yields white flakes, M.P. 120–122° C.

Analysis for: $C_{14}H_{14}O_2$.—Calculated: C, 78.48; H, 6.59. Found: C, 78.49; H, 6.63.

STEP C.—(4-BUTYRYL-2-NAPHTHYLOXY)ACETIC ACID 3-hydroxy-1-butyronaphthone (8.35 g., 0.039 mole) is dissolved in 100 ml. of absolute ethyl alcohol containing 0.043 mole sodium ethoxide. The mixture is heated and stirred for 5 minutes. Then 7.4 g. (0.044 mole) of ethyl bromoacetate is added and the reaction then is carried out by substantially the same method described in Example 1, Step D, to yield 9.5 g. of (4-butyryl-2-naphthyloxy)acetic acid, M.P. 111–116° C. Recrystallization from benzene, then isopropyl alcohol yields an analytical sample with a melting point of 122–124° C.

Analysis for: $C_{16}H_{16}O_4$.— Calculated: C, 70.57; H, 5.92. Found: C, 70.26; H, 5.97.

EXAMPLE 14

(6-butyryl-1-naphthyloxy)acetic acid

STEP A.—5-METHOXY-2-BUTYRONAPHTHONE

A Grignard reagent is prepared from 18.5 g. (0.15 mole) n-propyl bromide, 3.6 g. (0.15 mole) magnesium turnings and a trace of iodine in 175 ml. ether. This reagent is stirred and refluxed for one hour. Then 22.0 g. (0.12 mole) 5-methoxy-2-cyanonaphthalene in 400 ml. ether is added over one hour. The reaction mixture then is treated by substantially the same method described in Example 1, Step B, to give 5-methoxy-2-butyronaphthone in the form of yellow crystals weighing 19 g., M.P. 56–61° C. A recrystallization from isopropyl alcohol raises the M.P. to 60–63° C.

Analysis for: $C_{15}H_{16}O_2$.—Calculated: C, 78.92; H, 7.06. Found: C, 79.15; H, 7.11.

STEP B.—5-HYDROXY-2-BUTYRONAPHTHONE

The dehydration of aqueous pyridine hydrochloride to anhydrous pyridine hydrochloride for this demethylation is accomplished by heating 64 ml. (0.8 mole) pyridine and 70 ml. (0.8 mole) concentrated hydrochloric acid to 210° C. over approximately ½ hour. To this hot melt is added 19.0 g. (0.084 mole) 5-methoxy-2-butyronaphthone and the resulting dark homogeneous solution then is treated by substantially the same method described in Example 1, Step C, to give 14 g. of 5-hydroxy-2-butyronaphthone weighing 14 g., M.P. 135–137° C. Recrystallization from n-butyl chloride raises the M.P. to 138–140° C.

Analysis for: $C_{14}H_{14}O_2$.—Calculated: C, 78.48; H. 6.59. Found: C, 78.18; H, 6.82.

STEP C.—(6-BUTYRYL-1-NAPHTHYLOXY)ACETIC ACID 5-hydroxy-2-butyronaphthone (13.8 g., 0.065 mole) is dissolved in 200 ml. absolute ethyl alcohol containing 0.078 mole sodium ethoxide. This mixture is refluxed 10 minutes, then 21.7 g. (0.13 mole) ethyl bromoacetate is added and the mixture treated by substantially the same method described in Example 1, Step D, to give a solid which, after recrystallization from 50 ml. of a 50% mixture of ethanol and water, yields 5.8 g. of (6-butyryl-1-naphthyloxy)acetic acid, M.P. 130–133° C. One recrystallization from benzene raises the melting point to 134–136° C.

Analysis for: $C_{16}H_{16}O_4$.—Calculated: C, 70.57; H, 5.92. Found: C, 70.46; H, 5.78.

EXAMPLE 15

(5-chloro-4-butyryl-1-naphthyloxy)acetic acid

STEP A.—(5-CHLORO-1-NAPHTHYLOXY)ACETIC ACID

To a solution of 16. g. (0.09 mole) of 5-chloro-1-naphthol in 200 ml. of absolute ethanol containing 0.11 mole of sodium ethoxide, there is added, after stirring for five minutes, 18.3 g. (0.11 mole) of ethyl bromoacetate, and the reaction mixture then is treated by substantially the same method described in Example 1, Step D, to give (5-chloro-1-naphthyloxy)acetic acid which, after recrystallization from a mixture of benzene and methanol, melts at 170–181° C., yield 14.7 g.

Analysis for: $C_{12}H_9ClO_3$.—Calculated: C, 60.90; H, 3.83. Found: C, 61.16; H, 4.02.

STEP B.—(5-CHLORO-4-BUTYRYL-1-NAPHTHYLOXY) ACETIC ACID

Aluminum chloride (24.6 g., 0.18 mole) is added slowly to a well stirred mixture of 12.3 g. (0.05 mole) of (5-chloro-1-naphthyloxy)acetic acid, 6.3 g. (0.06 mole) of n-butyryl chloride and 300 ml. of carbon disulfide. The reaction mixture is treated by substantially the same method as described in Example 8, Step B, to give a solid which, after recrystallization from a mixture of benzene and methanol, yields 12.4 g. of (5-chloro-4-butyryl-1-naphthyloxy)acetic acid, M.P. 164–165.5° C.

Analysis for: $C_{16}H_{15}ClO_4$.—Calculated: C, 62.65; H, 4.93. Found: C, 62.75; H, 4.93.

EXAMPLE 16

(3-methyl-7-butyryl-1-naphthyloxy)acetic acid

STEP A.—1-METHOXY-3-METHYLNAPHTHALENE

A solution of 5.0 g. (0.0316 mole) of 3-methyl-1-naphthol in 14 ml. of 2.5 N sodium hydroxide and 15 ml. of water is warmed to 40° C. under nitrogen and 3.98 g. (0.0316 mole) of dimethyl sulfate is added over a 10 minute period with stirring. The reaction mixture then is treated by substantially the same method described in Example 1, Step A. The oily product obtained is extracted with ether, washed with water, dried and concentrated under reduced pressure, giving 1-methoxy-3-methylnaphthylene which distills at 95–97° C. at 0.5 mm., yield 5.1 g.

Analysis for: $C_{12}H_{12}O$.—Calculated: C, 83.69; H, 7.02. Found: C, 83.67; H, 7.07.

STEP B.—8-METHOXY-6-METHYL-2-BUTYRO-NAPHTHONE

A mixture of 4.0 g. (0.023 mole) of 1-methoxy-3-methylnaphthalene, 3.09 g. (0.029 mole) of butyryl chloride, and 50 ml. of nitrobenzene is cooled to 5° C. and 3.71 g. (0.028 mole) of aluminum chloride is added over 1½ hours. The mixture then is treated by substantially the same method described in Example 8, Step B, yielding 4.3 g. of a viscous yellow oil. Upon evaporative distillation, the distillate solidifies to a yellow solid which, after recrystallization from methylcyclohexane, gives 8-methoxy-6-methyl-2-butyronaphthone in the form of a pale yellow solid, M.P. 93.5–95.5° C.

Analysis for: $C_{16}H_{18}O_2$.—Calculated: C, 79.31; H, 7.49. Found: C, 79.30; H, 7.22.

STEP C.—8-HYDROXY-6-METHYL-2-BUTYRO-NAPHTHONE

A mixture of 5.0 g. (0.02 mole) of the product of Step B and 15.0 g. (0.13 mole) of pyridine hydrochloride is stirred under nitrogen at 200° C. for 1½ hours and then treated by substantially the same method described in Example 1, Step C, to give 2.0 g. of 8-hydroxy-6-methyl-2-butyronaphthone in the form of a yellow solid. Recrystallization from 50% aqueous isopropyl alcohol gives 8-hydroxy-6-methyl-2-butyronaphthone in the form of a pale yellow solid, M.P. 165–167.5° C.

Analysis for: $C_{15}H_{16}O_2$.—Calculated: C, 78.92; H, 7.06. Found: C, 78.66; H, 6.89.

STEP D.—(3-METHYL-7-BUTYRYL-1-NAPHTHYLOXY) ACETIC ACID

To a solution of 2.0 g. (0.009 mole) of the product of Step C in 50 ml. of absolute ethanol containing 0.0091 mole of sodium ethoxide, there is added, after 5 minutes, 1.8 g. (0.011 mole) of ethyl bromoacetate and the mixture then is refluxed for 4 hours and treated in substantially the same manner described in Example 1, Step D, to give 1.53 g. of (3-methyl-7-butyryl-1-naphthyloxy)acetic acid in the form of a tan solid. Recrystallization from a 50:50 mixture of benzene and cyclohexane gives the product in the form of a white solid, M.P. 141.5–143° C.

Analysis for: $C_{17}H_{18}O_4$.—Calculated: C, 71.31; H, 6.34. Found: C, 71.23; H, 6.63.

EXAMPLE 17

(4-butyryl-3-methyl-1-naphthyloxy)acetic acid

STEP A.—4-BROMO-3-METHYL-1-METHOXY-NAPHTHALENE

A solution of 34.4 g. (0.20 mole) of 1-methoxy-3-methylnaphthalene, prepared as described in Example 16, Step A, in 400 ml. of glacial acetic acid is heated to 80° C. Then a solution of 33.6 g. (0.21 mole) of bromine in 100 ml. of glacial acetic acid is added dropwise with stirring while maintaining the temperature at 80° C. The addition requires about 2 hours. Stirring is continued for 15 minutes. The mixture is poured into 2 liters of ice and water and the product is extracted into ether. The ether extract is washed with water, 1 N sodium hydroxide, and again with water. The ether solution is dried and concentrated under reduced pressure yielding a tan solid as a crude product in 90% yield. Recrystallization from methanol-water or acetic acid gives pure 4-bromo-3-methyl-1-methoxynaphthalene melting at 62–63.5° C.

Analysis for: $C_{12}H_{11}BrO$.—Calculated: C, 57.39; H, 4.42. Found: C, 57.22; H, 4.44.

STEP B.—4-(1-HYDROXYBUTYL)-3-METHYL-1-METHOXYNAPHTHALENE

A Grignard reagent is prepared from 1.34 g. (0.055 mole) of magnesium and 12.56 g. (0.05 mole) of 4-bromo-3-methyl-1-methoxynaphthalene in 60 ml. of tetrahydrofuran; the reaction being initiated with several drops of ethylene dibromide. The Grignard reagent is cooled to −30° C. and a solution of 3.97 g. (0.055 mole) of butyraldehyde in 40 ml. of tetrahydrofuran is added dropwise with stirring over a 25 minute period. Then the mixture is placed in an ice bath and stirred for 20 hours as the temperature rises slowly to 25° C. The tetrahydrofuran then is removed under reduced pressure and 100 ml. of ether is added, the mixture cooled in ice and decomposed by adding a solution of 5.35 g. (0.1 mole) of ammonium chloride in 50 ml. of water. The ether layer is separated, washed with water, dried, and concentrated under reduced pressure, yielding 11.8 g. of 4-(1-hydroxybutyl)-3-methyl-1-methoxynaphthalene as a viscous yellow oil.

STEP C.—4-BUTYRYL-3-METHYL-1-METHOXY-NAPHTHALENE

A pyridine-chromium complex is prepared by cooling 500 ml. of pyridine to 15° C. and adding 50.0 g. (0.5 mole) of chromium trioxide in small portions with stirring. The addition requires about ½ hour and stirring is continued for another ½ hour as the temperature rises to 25° C. The suspension is cooled to 5° C. and a solution of 43.0 g. of 4-(1-hydroxybutyl)-3-methyl-1-methoxynaphthalene in 500 ml. of pyridine is added. The mixture is stirred at 5° C. for 1½ hours and at room temperature overnight. The dark mixture which results is poured into 5 liters of water and then extracted with ether. The ether extract is washed with water, 1 N hydrochloric acid, 1 N sodium hydroxide, and again with water, and dried and concentrated under reduced pressure. A yellow liquid is obtained (36.2 g.). Pure 4-butyryl-3-methyl-1-methoxynaphthalene distills at 145–150° C. at 0.5 mm. pressure, $n_D^{25}$ 1.5875.

Analysis for: $C_{16}H_{18}O_2$.—Calculated: C, 79.31; H, 7.49. Found: C, 78.94; H, 7.34.

STEP D.—4-BUTYRYL-3-METHYL-1-NAPHTHOL

A mixture of 3.22 g. (0.14 mole) of sodium and 25 ml. of pyridine is heated under nitrogen at 160–180° C. for 15 minutes with rapid stirring. Then 4.85 g. (0.02 mole) of 4-butyryl-3-methyl-1-methoxynaphthalene in 20 ml. of pyridine is added and excess pyridine is allowed to distill out a side arm tube as the bath temperature is raised to 200° C. The mixture is heated at 200° C. for 5 hours. After cooling, several milliliters of pyridine are added followed by the cautious addition of 50 ml. of water. The aqueous solution is washed with ether, the ether solution washed with 1 N hydrochloric acid and then extracted with 1 N sodium hydroxide. The basic extract and aqueous solution are combined and acidified with excess hydrochloric acid. The solid which separates is extracted into ether, the ether extract washed with water, dried, and concentrated under reduced pressure. A yellow solid is obtained in 71% yield, M.P. 144–147.5° C. Recrystallization from ethanol-water gives pure 4-butyryl-3-methyl-1- naphthol as a pale yellow solid, M.P. 148.5–149.5° C.

Analysis for: $C_{15}H_{16}O_2$.—Calculated: C, 78.92; H, 7.06. Found: C, 78.78; H, 7.35.

STEP E.—(4-BUTYRYL-3-METHYL-1-NAPHTHYLOXY) ACETIC ACID 4-butyryl-3-methyl-1-naphthol (0.78 g., 0.0034 mole) is added to a solution of 25 ml. of absolute ethanol containing 0.0034 mole of sodium ethoxide and then 0.68 g. (0.004 mole) of ethyl bromoacetate is added. The solution is treated in essentially the same manner described in Example 1, Step D, to give an 84% yield of (4-butyryl-3-methyl-1-naphthyloxy)acetic acid as an oil which solidifies to a pale yellow solid, M.P. 126–129° C. Recrystallization from n-butyl chloride gives a white solid, M.P. 131–132.5° C.

Analysis for: $C_{17}H_{16}O_4$.—Calculated: C, 71.31; H, 6.34. Found: C, 71.15; H, 6.56.

EXAMPLE 18

*(4-butyryl-5-methyl-1-naphthyloxy)acetic acid*

STEP A.—1-HYDROXY-1-METHYL-1,2,3,4-TETRAHYDRO-5-NAPHTHOL

A Grignard reagent is prepared by treating 43.8 g. (1.8 mole) of magnesium with 256 g. (1.8 mole) of methyl iodide in 900 ml. of ether under nitrogen. Then 74.0 g. (0.36 mole) of 5-acetoxy-3,4-dihydro-1(2H)-naphthalenone in 750 ml. of tetrahydrofuran is added and the mixture stirred under nitrogen for 48 hours. The ether and tetrahydrofuran then are removed under reduced pressure and 500 ml. of ether added and the mixture decomposed by adding excess aqueous ammonium chloride. The ether layer is separated, washed with a mixture of water and dilute hydrochloric acid, dried, and concentrated under reduced pressure to give 63 g. of 1-hydroxy-1-methyl-1,2,3,4-tetrahydro-5-naphthol as a yellow solid.

STEP B.—ETHYL (5-HYDROXY-5-METHYL-5,6,7,8-TETRAHYDRO-1-NAPHTHYLOXY) ACETATE

The 63 g. (0.35 mole) of crude 1-hydroxy-1-methyl-1,2,3,4-tetrahydro-5-naphthol is treated with 65.1 g. (0.39 mole) of ethyl bromoacetate and 16.7 g. (0.37 mole) of sodium ethoxide as in Example 2, Step C, to give crude ethyl (5-hydroxy-5-methyl-5,6,7,8-tetrahydro-1-naphthyloxy)acetate in nearly quantitative yield as a dark yellow oil.

STEP C.—ETHYL (7,8-DIHYDRO-5-METHYL-1-NAPHTHYLOXY)ACETATE

The crude ethyl (5-hydroxy - 5 - methyl-5,6,7,8-tetrahydro-1-naphthyloxy)acetate is dehydrated by dissolving 32.4 g. (0.123 mole) thereof in 40 ml. of benzene and 75 ml. of pyridine and adding 20 g. (0.13 mole) of phosphorous oxychloride. The mixture is stirred on the steam bath for 2 hours and then the solvents are removed under reduced pressure. The residual mixture of oil and solid materials is taken up in 250 ml. of ether and 100 ml. of water, the ether layer separated, washed with dilute hydrochloric acid and water, dried, and concentrated under reduced pressure to give 26.1 g. (87%) of ethyl (7,8-dihydro-5-methyl-1-naphthyloxy)acetate as a dark yellow oil.

STEP D.—ETHYL (5-METHYL-5,6,7,8-TETRAHYDRO-1-NAPHTHYLOXY) ACETATE

The crude ethyl (7,8-dihydro-5-methyl-1-naphthyloxy) acetate is hydrogenated by dissolving 53.0 g. (0.215 mole) in 200 ml. of absolute ethanol and shaking with 5% palladium on carbon under 30 lbs./sq. in. of hydrogen until approximately the theoretical quantity of hydrogen is taken up and hydrogenation ceases. The mixture is filtered under nitrogen and the filtrate concentrated under reduced pressure to give a nearly quantitative yield of ethyl (5-methyl-5,6,7,8-tetrahydro-1-naphthyloxy)acetate.

STEP E.—(5-METHYL-5,6,7,8-TETRAHYDRO-1-NAPHTHYLOXY)ACETIC ACID

An 11.8 g. (0.0476 mole) portion of ethyl (5-methyl-5,6,7,8-tetrahydro-1-naphthyloxy)acetate is dissolved in 100 ml. of ethanol, and 5.61 g. (0.10 mole) of potassium hydroxide in 25 ml. of water is added. The solution is heated at reflux for ½ hour, the ethanol removed under reduced pressure and the salt dissolved in 150 ml. of water. The aqueous solution then is washed with ether and acidified with excess hydrochloric acid and filtered to give 8.1 g. of a pale tan solid, M.P. 152–155° C. Recrystallization from ethanol-water gives white (5-methyl-5,6,7,8-tetrahydro-1-naphthyloxy)acetic acid, M.P. 156.5–158.5° C.

Analysis for: $C_{13}H_{16}O_3$.—Calculated: C, 70.89; H, 7.32. Found: C, 70.81; H, 7.17.

STEP F.—(4-BUTYRYL-5-METHYL-5,6,7,8-TETRAHYDRO-1-NAPHTHYLOXY)ACETIC ACID

By replacing the (2-methyl-1-naphthyloxy)acetic acid and the carbon disulfide of Example 8, Step B, with equimolar quantities of (5-methyl-5,6,7,8-tetrahydro-1-naphthyloxy)acetic acid and methylene chloride and extending the time at reflux to 16 hours, there is obtained a 94% yield of (4-butyryl-5-methyl-5,6,7,8-tetrahydro-1-naphthyloxy)acetic acid as a yellow oil.

STEP G.—ETHYL (AND METHYL) (4-BUTYRYL-5-METHYL-5,6,7,8-TETRAHYDRO-1-NAPHTHYLOXY)ACETATE

The ethyl ester is prepared from 5.4 g. (0.0185 mole) of (4-butyryl-5-methyl-5,6,7,8-tetrahydro-1-naphthyloxy) acetic acid by heating at reflux with 75 ml. of absolute ethanol and several drops of concentrated sulfuric acid for 1½ hours with a slow distillation of the ethanol. Then the ethanol is removed under reduced pressure and the residual oil taken up in ether. The ether is washed with water and cold sodium carbonate solution, dried, filtered, and concentrated to give 4.4 g. of ethyl (4-butyryl-5-methyl-5,6,7,8-tetrahydro-1-naphthyloxy)acetate distilling at 208–212° C./0.5 mm. by short-path distillation, $n_D^{25}$ 1.5364.

Analysis for: $C_{19}H_{26}O_4$.—Calculated: C, 71.67; H, 8.23. Found: C, 71.60; H, 7.98.

The methyl ester is prepared by a similar procedure employing methanol in place of the ethanol indicated supra.

STEP H.—METHYL (4-BUTYRYL-5-METHYL-1-NAPHTHYLOXY)ACETATE

Methyl (4-butyryl-5-methyl-5,6,7,8-tetrahydro-1-naphthyloxy)acetate, 9.11 g. (0.03 mole), is dissolved in 100 ml. of anhydrous benzene. Then 8.52 g. (0.0375 mole) of 2,3-dichloro-5,6-dicyano-1,4-benzoquinone is added and the mixture is stirred at reflux for 3 hours under nitrogen. Another 8.52 g. (0.0375 mole) of the quinone is added and reflux continued for an additional 16 hours. The cooled reaction mixture is filtered and the filtrate concentrated under reduced pressure to a dark oil. The oil is taken up in 100 ml. of ether, the ether solution washed thoroughly with water, sodium bicarbonate (cold) and again with water, dried, and concentrated under reduced pressure to give 5.90 g. of methyl (4-butyryl-5-methyl-1-naphthyloxy)acetate as a pale tan solid. Continued recrystallization from isopropanol-water raised the melting point to 89–94° C.

STEP I.—(4-BUTYRYL-5-METHYL-1-NAPHTHYLOXY)ACETIC ACID

Hydrolysis of methyl (4-butyryl-5-methyl-1-naphthyloxy)acetate is accomplished in 82% yield by the procedure of Example 18, Step E. The white solid is recrystallized from isopropanol-water to yield pure (4-butyryl-5-methyl-1-naphthyloxy)acetic acid, M.P. 138.5–140° C.

Analysis for: $C_{17}H_{18}O_4$.—Calculated: C, 71.31; H, 6.34. Found: C, 71.11; H, 6.42.

EXAMPLE 19

(6-methyl-4-butyryl-1-naphthyloxy)acetic acid

STEP A.—(6-METHYL-1-NAPHTHYLOXY)ACETIC ACID

By replacing the 5-hydroxy-1-butyronaphthone of Example 1, Step D by an equimolecular quantity of 6-methyl-1-naphthol and following substantially the same procedure described therein, there is obtained (6-methyl-1-naphthyloxy)acetic acid.

STEP B.—(6-METHYL-4-BUTYRYL-1-NAPHTHYLOXY)ACETIC ACID

By replacing the (2-methyl-1-naphthyloxy)acetic acid of Example 8, Step B by an equimolecular quantity of (6-methyl-1-naphthyloxy)acetic acid and following substantially the same procedure described therein, there is obtained (6-methyl-4-butyryl-1-naphthyloxy)acetic acid.

EXAMPLE 20

(4-n-valeryl-1-naphthyloxy)acetic acid

By following substantially the same procedure described in Example 8, Step B, but replacing the (2-methyl-1-naphthyloxy)acetic acid and the butyryl chloride employed therein by equivalent quantities of (1-naphthyloxy)acetic acid and n-valeryl chloride, respectively, there is obtained (4-n-valeryl-1-naphthyloxy)acetic acid.

EXAMPLE 21

(4-isovaleryl-1-naphthyloxy)acetic acid

By replacing the (2-methyl-1-naphthyloxy)acetic acid and the butyryl chloride employed in Example 8, Step B, by equivalent quantities of (1-naphthyloxy)acetic acid and isovaleryl chloride, respectively, and following substantially the same procedure described in Example 8, Step B, there is obtained (4-isovaleryl-1-naphthyloxy)acetic acid, M.P. 120–121.5° C.

Analysis for: $C_{17}H_{18}O_4$.—Calculated: C, 71.31; H, 6.34. Found: C, 71.37; H, 6.25.

EXAMPLE 22

(4-caproyl-1-naphthyloxy)acetic acid

By replacing the (2-methyl-1-naphthyloxy)acetic acid and butyryl chloride employed in Example 8, Step B, by equimolecular quantities of (1-naphthyloxy)acetic acid and caproyl chloride, respectively, and following substantially the same procedure described in Example 8, Step B, there is obtained (4-caproyl-1-naphthyloxy)acetic acid.

EXAMPLE 23

(4-enanthyl-1-naphthyloxy)acetic acid

By replacing the (2-methyl-1-naphthyloxy)acetic acid and the butyryl chloride employed in Example 8, Step B, by equimolecular quantities of (1-naphthyloxy)acetic acid and enanthyl chloride, respectively, and following substantially the same procedure described in Example 8, Step B, there is obtained (4-enanthyl-1-naphthyloxy)acetic acid.

EXAMPLE 24

[4-(β-phenylpropionyl)-1-naphthyloxy]acetic acid

STEP A.—(4-ACETYL-1-NAPHTHYLOXY)ACETIC ACID

By replacing the (2-methyl-1-naphthyloxy)acetic acid and the butyryl chloride employed in Example 8, Step B, by equimolecular quantities of (1-naphthyloxy)acetic acid and acetyl chloride, respectively, and following substantially the same procedure described in Example 8, Step B, there is obtained (4-acetyl-1-naphthyloxy)acetic acid.

STEP B.—[4-(β-PHENYLPROPIONYL)-1-NAPHTHYLOXY]ACETIC ACID

Equimolecular quantities of (4-acetyl-1-naphthyloxy)acetic acid and benzaldehyde are dissolved in a mixture of sodium hydroxide (about 3 mole excess) in water and ethanol. The solution is kept at 25–30° C. for about 16 hours, acidified with hydrochloric acid and the solid that separates is collected and dried to give [4-(β-phenylacryloyl)-1-naphthyloxy]acetic acid. The [4-(β-phenylacryloyl)-1-naphthyloxy]acetic acid is dissolved in isopropyl alcohol and hydrogenated in the presence of 5% palladium on charcoal at 25° C. and at about 750 mm. pressure until the required amount of hydrogen is absorbed. The solution is then warmed and filtered to remove the catalyst and the alcohol is removed from the product by evaporation to give [4-(β-phenylpropionyl)-1-naphthyloxy]acetic acid.

EXAMPLE 25

(4-cyclopentylcarbonyl-1-naphthyloxy)acetic acid

To a precooled mixture of 1-methoxynaphthalene (0.334 mole), cyclopentanecarbonyl chloride (0.334 mole) and petroleum ether (300 ml.) is added a slight excess of powdered aluminum chloride (0.36 mole) over a period of one hour with stirring. This mixture then is heated at 40° C. for about 6 hours with intermittent stirring, cooled, poured into a mixture of ice and water and concentrated hydrochloric acid and extracted with ether. The ether extract then is distilled to give cyclopentyl 4-methoxy-1-naphthyl ketone. Treatment of this product with pyridine hydrochloride by substantially the same procedure described in Example 1, Step C, gives cyclopentyl 4-hydroxy-1-naphthyl ketone. This product is added to a solution of sodium ethoxide in ethyl alcohol and then reacted with a slight excess of ethyl bromoacetate by substantially the same procedure described in Example 1, Step D, to give (4-cyclopentylcarbonyl-1-naphthyloxy)acetic acid.

EXAMPLE 26

[4-(cyclohexylcarbonyl)-1-naphthyloxy]acetic acid

To a mixture of equimolecular quantities of 1-methoxynaphthalene and cyclohexanecarbonyl chloride in ligroin, a slight excess of aluminum chloride is added gradually with stirring at a temperature of about 5–15° C. After addition is complete, the mixture is allowed to warm to 25° C. and then is stirred for approximately 3 hours and kept at 25–30° C. for approximately 16 hours. The ligroin is decanted and the residue hydrolyzed with water containing a small amount of concentrated hydrochloric acid to give cyclohexyl 4-methoxy-1-naphthyl ketone. This product then is treated with pyridine hydrochloride by substantially the same procedure described in Example 1, Step C, to give cyclohexyl 4-hydroxy-1-naphthyl ketone. This product then is added to a solution of sodium ethoxide in ethyl alcohol and treated with a slight excess of ethyl bromoacetate by substantially the same procedure described in Example 1, Step C, to yield [4-(cyclohexylcarbonyl)-1-naphthyloxy]acetic acid.

EXAMPLE 27

[4-(β-carboxypropionyl)-1-naphthyloxy]acetic acid 4-(β-carboxypropionyl)-1-naphthol (0.05 mole) is dissolved in 250 ml. of absolute ethanol containing 0.12 mole of sodium ethoxide. After the solution has refluxed for 10 minutes, 20 g. of ethyl bromoacetate (0.12 mole) is added and the solution then is treated by substantially the same method described in Example 1, Step D, to give a precipitate which, upon recrystallization from a mixture of ethanol and water, yields [4-(β-carboxypropionyl)-1-naphthyloxy]acetic acid, M.P. 169–171° C.

EXAMPLE 28

α-(4-butyryl-1-naphthyloxy)propionic acid 4-hydroxy-1-butyronaphthone is added to a solution of sodium methoxide in ethyl alcohol and reacted with a slight excess of ethyl α-bromopropionate by following the same procedure described in Example 1, Step D. The product thus obtained is α-(4-butyryl-1-naphthyloxy)-propionic acid.

EXAMPLE 29

4-(4-butyryl-1-naphthyloxymethyl)benzoic acid

STEP A.—4-CHLOROMETHYLBENZONITRILE p-Tolunitrile (0.854 mole) is placed in a 3-necked flask fitted with gas inlet-outlet tube, stirrer and thermometer. Stirring is started and the nitrile is heated to 120–130° C. Chlorine gas is passed into the liquid at a moderate rate, and the reaction activated by an incandescent lamp. The addition is continued until the nitrile takes up 30 g. of the gas (about 2 hours). The material is allowed to stand overnight in air whereupon a crystalline mass forms. This is washed twice with ethanol and dried in air. Concentration of the ethanol solution to half its volume gives a 57% yield of 4-chloromethylbenzonitrile, M.P. 75–77° C.

STEP B.—4-CHLOROMETHYLBENZOIC ACID 4-chloromethylbenzonitrile (0.164 mole) is refluxed and stirred with concentrated hydrochloric acid (500 ml.) for about 14 hours. Upon cooling, a solid is obtained which is removed by filtration and dried in a desiccator to give a 94.5% yield of 4-chloromethylbenzoic acid, M.P. 202–203° C.

STEP C.—ETHYL 4-CHLOROMETHYLBENZOATE 4-chloromethylbenzoic acid (0.156 mole) is dissolved in absolute ethanol (225 ml.) and heated to 60° C. in a 4-necked flask fitted with gas inlet tube, thermometer, stirrer, reflux condenser, and drying tube. Stirring is started and anhydrous hydrogen chloride gas is passed in for one hour, the temperature being maintained at 50–60° C. The solution then is refluxed one hour, cooled and permitted to stand overnight. The ethanol then is evaporated in vacuo, the residue taken up in ether, washed with 5% sodium carbonate, dried and evaporated to an oil which distills at 91–93° C. at 0.6 mm. pressure to give a 74% yield of ethyl 4-chloromethylbenzoate.

STEP D.—4-(4-BUTYRYL-1-NAPHTHYLOXYMETHYL)BENZOIC ACID 4-hydroxybutyronaphthone (0.25 mole) is dissolved in anhydrous methanol (500 ml.), and sodium metal (0.2 mole) is added in portions. When all the sodium dissolves, ethyl 4-chloromethylbenzoate (0.125 mole) is added and the mixture is refluxed for 19 hours. The volume of methanol is reduced to 200 ml. and the mixture cooled, filtered, water added and the mixture extracted with ether. The ether extract is washed with 5% sodium hydroxide, dried and evaporated to remove the ether. The residue is taken up in 10% sodium hydroxide and heated on a steam bath with stirring for 2 hours. After cooling and acidification with hydrochloric acid, there is obtained 4-(4-butyryl-1-naphthyloxymethyl)benzoic acid.

EXAMPLE 30

3-(4-butyryl-1-naphthyloxymethyl)benzoic acid

STEP A.—METHYL 3-BROMOMETHYLBENZOATE 3-methylbenzoyl chloride (0.68 mole) is placed in a 4-necked flask, fitted with stirrer, reflux condenser, drying tube, thermometer and dropping funnel, and heated to 180° C. Stirring is started and the temperature maintained at 180° C., and bromine (0.69 mole) is added dropwise over a period of about 1 hour. The mixture then is stirred an additional 1.5 hours at 180° C. and finally cooled. With stirring maintained, methanol (67 ml.) is added to the mixture dropwise over an hour. The mixture then is distilled to give the pure product which crystallizes upon standing. There is thus obtained a 50% yield of methyl 3-bromomethylbenzoate, B.P. 136–137° C. at 8 mm. pressure.

STEP B.—METHYL 3-(4-BUTYRYL-1-NAPHTHYLOXYMETHYL)BENZOATE 4-hydroxybutyrophenone (0.09 mole) is dissolved in anhydrous methanol (200 ml.) and sodium metal (0.075 mole) is added in portions. When all the sodium is dissolved, methyl 3-bromomethylbenzoate (0.044 mole) is added and the mixture refluxed 24 hours. The volume of solvent then is reduced to about 50 ml. and about 250 ml. of water is added. The mixture is extracted with ether, washed with 5% sodium hydroxide and water, dried and evaporated to give methyl 3-(4-butyryl-1-naphthyloxymethyl)benzoate.

STEP C.—3-(4-BUTYRYL-1-NAPHTHYLOXYMETHYL)BENZOIC ACID

Methyl 3 - (4 - butyryl-1-naphthyloxymethyl)benzoate (0.018 mole) is heated on the steam bath and stirred for 1.5 hours with 10% sodium hydroxide (25 ml.). After cooling and acidification, there is obtained 3-(4-butyryl-1-naphthyloxymethyl)benzoic acid.

EXAMPLE 31

4-(4-butyryl-1-naphthyloxy)benzoic acid

STEP A.—4-(1-NAPHTHYLOXY)BENZOIC ACID

Sodium hydride (0.063 mole) is dissolved in anhydrous ethylene glycol dimethyl ether (50 ml.). To this mixture is added 0.058 mole of 1-naphthol as rapidly as evolution of hydrogen gas permits. The glycol dimethyl ether is evaporated in vacuo leaving a dry solid. Additional 1-naphthol (0.02 mole) dry copper metal (1 gram) as catalyst and methyl p-iodobenzoate (0.057 mole) are added and the whole mixed together. This mixture is heated on a Wood's metal bath at 180–200° C. for 5 hours and cooled, yielding a precipitate which is taken up in ethyl acetate. The ethyl acetate solution is extracted several times with saturated aqueous sodium bicarbonate. The combined aqueous extracts are acidified yielding a precipitate of 4-(1-naphthyloxy)benzoic acid.

STEP B.—4-(4-BUTYRYL-1-NAPHTHYLOXY)BENZOIC ACID

By following substantially the same procedure described in Example 8, Step B, but replacing the (2-methylnaphthyloxy)acetic acid employed therein by an equivalent quantity of 4-(1-naphthyloxy)benzoic acid, there is obtained 4-(4-butyryl-1-naphthyloxy)benzoic acid.

EXAMPLE 32

*(4-isocaproyl-1-naphthyloxy)acetic acid*

By replacing the (2-methyl-1-naphthyloxy)acetic acid and the butyryl chloride employed in Example 8, Step B, by equivalent quantities of (1-naphthyloxy)acetic acid and isocaproyl chloride, respectively, and following substantially the same procedure described in Step B of Example 8, there is obtained (4-isocaproyl-1-naphthyloxy)acetic acid.

EXAMPLE 33

*[4-(α-ethylisovaleryl)-1-naphthyloxy]acetic acid*

By replacing the (2-ethyl-1-naphthyloxy)acetic acid and the butyryl chloride employed in Example 8, Step B, by equivalent quantities of (1-naphthyloxy)acetic acid and α-ethylisovaleryl chloride and following substantially the same procedure described in Example 8, Step B, there is obtained [4 - (α-ethylisovaleryl)-1-naphthyloxy]acetic acid.

EXAMPLE 34

*(4-cyclopentaneacetyl-1-naphthyloxy)acetic acid*

By replacing the (2-methyl-1-naphthyloxy)acetic acid and the butyryl chloride employed in Example 8, Step B, by equimolecular quantities of (1-naphthyloxy)acetic acid and cyclopentaneacetyl chloride, respectively, and following substantially the same procedure described in Step B of Example 8, there is obtained (4-cyclopentaneacetyl-1-naphthyloxy)acetic acid.

EXAMPLE 35

*(4-cyclohexaneacetyl-1-naphthyloxy)acetic acid*

By replacing the (2-methyl-1-naphthyloxy)acetic acid and the butyryl chloride employed in Example 8, Step B, by equivalent quantities of (1-naphthyloxy)acetic acid and cyclohexaneacetyl chloride, respectively, and following substantially the same procedure described in Example 8, Step B, there is obtained (4-cyclohexaneacetyl-1-naphthyloxy)acetic acid.

EXAMPLE 36

*[4-(γ-phenylmercaptobutyryl)-1-naphthyloxy]acetic acid*

STEP A.—[4-(γ-CHLOROBUTYRYL)-1-NAPHTHYLOXY] ACETIC ACID

By replacing the (2-methyl-1-naphthyloxy)acetic acid and the butyryl chloride employed in Example 8, Step B, by equivalent quantities of (1-naphthyloxy)acetic acid and γ-chlorobutyryl chloride respectively, and following substantially the same procedure described in Step B of Example 8, there is obtained [4-(γ-chlorobutyryl)-1-naphthyloxy]acetic acid.

STEP B.—[4-(γ-PHENYLMERCAPTOBUTYRYL)-1-NAPHTHYLOXY]ACETIC ACID

A solution of 2.2 ml. of thiophenol in 50 ml. of ethanol containing 1.12 g. of potassium hydroxide and 2.6 g. of [4-(γ-chlorobutyryl)-1-naphthyloxy]acetic acid is heated on a steam bath for 30 minutes, cooled and poured into 16 ml. of water. The solution is acidified with hydrochloric acid and the resulting product is extracted with ether. The ethereal extract is washed with water, dried over sodium sulfate, filtered and evaporated to dryness to give [4 - (γ - phenylmercaptobutyryl) - 1-naphthyloxy] acetic acid.

EXAMPLE 37

*(4-benzylmercaptoacetyl-1-naphthyloxy)acetic acid*

STEP A.—(4-CHLOROACETYL-1-NAPHTHYLOXY) ACETIC ACID

By replacing the (2-methyl-1-naphthyloxy)acetic acid and the butyryl chloride employed in Example 8, Step B, by equivalent quantities of (1-naphthyloxy)acetic acid and chloroacetyl chloride, respectively, and following substantially the same procedure described in Example 8, Step B, there is obtained (4-chloroacetyl-1-naphthyloxy) acetic acid.

STEP B.—(4-BENZYLMERCAPTOACETYL-1-NAPHTHYLOXY)ACETIC ACID

By replacing the [4-(γ-chlorobutyryl)-1-naphthyloxy] acetic acid and the thiophenol employed in Example 37, Step B, by equivalent quantities of (4-chloroacetyl-1-naphthyloxy)acetic acid and benzylmercaptan, respectively, and following substantially the same procedure described in Example 37, Step B, there is obtained (4-benzylcarcaptoacetyl-1-naphthyloxy)acetic acid.

EXAMPLE 38

*[4-(β-trifluoromethylbutyryl)-1-naphthyloxy]acetic acid*

Aluminum chloride (0.28 mole) is added portionwise over 45 minutes to a mixture of 0.093 mole of (1-naphthyloxy)acetic acid and 0.095 mole of β-trifluoromethylbutyryl chloride in 250 ml. of carbon disulfide cooled in an ice bath. The mixture is stirred at room temperature for 5 hours and allowed to stand at room temperature for an additional 18 hours. The reaction mixture then is worked up in substantially the same manner as described in Example 8, Step B, to give [4-(β-trifluoromethylbutyryl)-1-naphthyloxy]acetic acid.

EXAMPLE 39

*(4-phenoxyacetyl-1-naphthyloxy)acetic acid*

A solution of (4 - chloroacetyl-1-naphthyloxy)acetic acid, prepared as described in Example 37, Step A, (0.01 mole) and phenol (0.02 mole) in 50 ml. of water and 4 ml. of 20% aqueous sodium hydroxide is heated on the steam bath for one hour, cooled and acidified with hydrochloric acid to give (4-phenoxyacetyl-1-naphthyloxy) acetic acid.

EXAMPLE 40

*α-(4-butyryl-1-naphthyloxy)isovaleric acid*

By following substantially the same procedure described in Example 1, Step D, but replacing the 5-hydroxy-1-butyronaphthone and the ethyl bromoacetate described therein by equimolecular quantities of 4-hydroxy-1-butyronaphthone and ethyl α-bromoisovalerate, respectively, and following substantially the same procedure described in Step D of Example 1, there is obtained α-(4-butyryl-1-naphthyloxy)isovaleric acid.

EXAMPLE 41

*[4-(α-propylvaleryl)-1-naphthyloxy]acetic acid*

By replacing the (2-methyl-1-naphthyloxy)acetic acid and the butyryl chloride employed in Step B of Example 8 by equimolecular quantities of 1-naphthyloxyacetic acid and α-propylvaleryl chloride, respectively, and following substantially the same procedure described in Example 8, Step B, there is obtained [4-(α-propylvaleryl)-1-naphthyloxy]acetic acid.

EXAMPLE 42

*(3-butyryl-2-naphthyloxy)acetic acid*

STEP A.—3-METHOXY-2-BUTYRONAPHTHONE 3-methoxy-2-naphthoyl chloride (15.4 g., 0.07 mole) in 50 ml. of benzene is added dropwise to propyl cadmium (0.11 mole) in 100 ml. of benzene at reflux temperatures. After the addition is complete, the suspension is refluxed one hour, cooled to 25° C. and poured onto cold, dilute sulfuric acid. The mixture then is extracted with ether and the extract concentrated to yield 3-methoxy-2-butyronaphthone. After recrystallization from hexane 10.5 g. of 3-methoxy-2-butyronaphthone melting at 53.5–55° C. are obtained.

Analysis for: $C_{15}H_{16}O_2$.—Calculated: C, 78.92; H, 7.06. Found: C, 78.99; H, 6.98.

STEP B.—3-HYDROXY-2-BUTYRONAPHTHONE

Aluminum chloride (10 g.) is added to a solution of 3-methoxy-2-butyronaphthone (5 g.) in 75 ml. of xylene at 90° C. After refluxing for eight minutes the mixture is poured onto cold dilute hydrochloric acid and extracted with ether. Concentration of the ether gives 4 g. of 3-hydroxy-2-butyronaphthone which, after recrystallization from hexane, melts at 83–85.5° C.

STEP C.—(3-BUTYRYL-2-NAPHTHYLOXY)ACETIC ACID

To a suspension of potassium carbonate (10 g.) in 200 ml. of acetone is added 3-hydroxy-2-butyronaphthone (5.5 g., 0.025 mole) and ethyl bromoacetate (4.3 g., 0.025 mole). The mixture is refluxed for 17 hours, the inorganic salts filtered off and the filtrate concentrated to an oil. The residual oil is suspended in 100 ml. of a 15% potassium hydroxide solution and heated at 100° C. for 0.5 hour. The resulting solution is acidified with hydrochloric acid; a solid precipitates and the precipitate is then extracted with ether. The ether solution is extracted with aqueous sodium bicarbonate and the alkaline extract acidified with hydrochloric acid to yield a solid. After recrystallization from benzene 4.5 g. of (3-butyryl-2-naphthyloxy)acetic acid melting at 141–142° C. is obtained.

Analysis for: $C_{16}H_{16}O_4$.—Calculated: C, 70.57; H, 5.92. Found: C, 70.87; H, 6.22.

EXAMPLE 43

(2-butyryl-1-naphthyloxy)acetic acid 1-hydroxy-2-butyronaphthone (21.4 g., 0.1 mole) and ethyl bromoacetate (17 g., 0.1 mole) are added to a suspension of potassium carbonate (40 g.) in 1 liter of acetone. The mixture is refluxed for 2 hours, stirred for 17 hours and then refluxed an additional 2 hours. The inorganic salts which separate out are then removed by filtration and the filtrate is concentrated under reduced pressure to yield an oil. The oil is suspended in 500 ml. of a 10% aqueous sodium hydroxide solution and heated 1.5 hours at 100° C. The solution is cooled, acidified with hydrochloric acid and extracted with ether. The ether solution is then extracted with sodium bicarbonate and the basic extract acidified with hydrochloric acid to yield an oil, which is subsequently extracted with ether. The ether solution is concentrated to give 14.5 g. of (2-butyryl-1-naphthyloxy)acetic acid; the cyclohexylamine salt of which melts at 119–120° C.

Analysis for: $C_{16}H_{16}O_4 \cdot C_6H_{15}N$.—Calculated: C, 71.13; H, 7.87; N, 3.77. Found: C, 71.02; H, 8.05; N, 3.67.

EXAMPLE 44

(1-butyryl-2-naphthyloxy)acetic acid 2-hydroxy-1-butyronaphthone (6.4 g., 0.03 mole) is added to a solution of sodium ethoxide (0.036 mole) in 100 ml. of ethanol. Ethyl bromoacetate (6.0 g., 0.036 mole) is added and the reaction mixture is refluxed 4 hours. The solvent is then removed and 250 ml. of water is added to the residue. The aqueous solution is extracted with ether and the ether extract concentrated to yield ethyl (1-butyryl-2-naphthyloxy)acetate which is evaporatively distilled to give 5.5 g. of product, B.P. 190–200° C./0.6 mm.

Ethyl (1-butyryl-2-naphthyloxy)acetate (4 g.) is added to 50 ml. of a 20% sodium hydroxide solution which is heated 1 hour at 100° C. The solution is cooled, acidified with hydrochloric acid and the product extracted with ether. The ether solution is then extracted with aqueous sodium bicarbonate and the resulting alkaline extract is acidified with hydrochloric acid to yield (1-butyryl-2-naphthyloxy)acetic acid. After recrystallization from n-butyl chloride there is obtained 2.3 g. of (1-butyryl-2-naphthyloxy)acetic acid melting at 102–103.5° C.

Analysis for: $C_{16}H_{16}O_4$.—Calculated: C, 70.57; H, 5.92. Found: C, 10.71; H, 6.09.

EXAMPLE 45

(8-butyryl-1-naphthyloxy)acetic acid

STEP A.—8-METHOXY-1-BUTYRONAPHTHONE

Thionyl chloride is added dropwise to a solution of 8-methoxy-1-naphthoic acid (4 g., 0.02 mole) in 40 ml. of ether. After refluxing 45 minutes, the solvent and excess thionyl chloride are removed under reduced pressure to yield 3.3 g. of crude acid chloride which, after recrystallization from cyclohexane, melts at 59–64° C. The crude 8-methoxy-1-naphthoyl chloride (3.3 g., 0.015 mole) is then dissolved in 25 ml. of benzene and added to suspension of a refluxing solution of propyl cadmium (0.025 mole) in 40 ml. of benzene. The suspension is refluxed 45 minutes, stirred at room temperature for 45 minutes and poured onto cold, dilute sulfuric acid. The mixture is extracted with ether, and the ethereal solution concentrated to an oil. After evaporative distillation at 180° C./1 mm., 1.8 g. of pure 8-methoxy-1-butyronaphthone is obtained.

Analysis for: $C_{15}H_{16}O_2$.—Calculated: C, 78.92; H, 7.06. Found: C, 78.99; H, 7.34.

STEP B.—8-HYDROXY-1-BUTYRONAPHTHONE

To a solution of 8-methoxy-1-butyronaphthone (2.1 g., 0.01 mole) in methylene chloride (100 ml.), which has been cooled to −80° C., is added boron tribromide (3 g., 0.02 mole). The reaction mixture is allowed to warm to 25° C. and poured into water. The organic layer is separated and concentrated to yield 8-hydroxy-1-butyronaphthone.

STEP C.—(8-BUTYRYL-1-NAPHTHYLOXY)ACETIC ACID

By substituting 8-hydroxy-1-butyronaphthone for the 3-hydroxy-2-butyronaphthone of Example 42, Step C, and following substantially the procedure described therein, the compound (8-butyryl-1-naphthyloxy)acetic acid is prepared.

EXAMPLE 46

2-(4-butyryl-1-naphthyloxy)-2-methylpropionic acid 4-hydroxy-1-butyronaphthone (20.8 g., 0.0972 mole) is dissolved in 125 ml. of acetone and protected from oxidation by an atmosphere of nitrogen. To this solution 19.4 g. (0.485 mole) of sodium hydroxide is added over a 15 minute period and the mixture is heated to reflux. Chloroform (14.5 g., 0.122 mole) is added over 15 minutes and then the reaction is stirred and heated for 5 hours. The organic solvents are removed by evaporation under vacuum and the residue is dissolved in a mixture of 300 ml. of water and 150 ml. of ether. The layers are separated and the ether solution is extracted once with 100 ml. of 0.5 N sodium hydroxide. The aqueous alkaline solution thus obtained is then acidified with hydrochloric acid and extracted with ether. The ether extract is then extracted three times with saturated sodium carbonate solution and the aqueous portions are combined. Acidification of the combined sodium carbonate solutions yields 25.4 g. (87%) of solid 2-(4-butyryl-1-naphthyloxy)-2-methylpropionic acid. Recrystallization from butyl chloride gives material which melts at 142–143° C.

Analysis for: $C_{18}H_{20}O_4$.—Calculated: C, 71.98; H, 6.71. Found: C, 71.94; H, 6.55.

EXAMPLE 47

*2-(5-butyryl-2-naphthyloxy)-2-methylpropionic acid*

By substituting 6-hydroxy-1-butyronaphthone for the 4-hydroxy-1-butyronaphthone of Example 46, and following substantially the same procedure described therein, the compound 2-(5-butyryl-2-naphthyloxy)-2-methylpropionic acid is prepared.

Following the acidification of the sodium carbonate solution an 84.4% yield of solid is obtained. Recrystallization from butyl chloride yields pure 2-(5-butyryl-2-naphthyloxy)-2-methylpropionic acid melting at 119–120° C.

*Analysis for:* $C_{18}H_{20}O_4$.—Calculated: C, 71.98; H, 6.71. Found: C, 71.98; H, 6.69.

EXAMPLE 48

*2-(6-propionyl-2-naphthyloxy)-2-methylpropionic acid*

By substituting 6-hydroxy-2-propionaphthone for the 4-hydroxy-1-butyronaphthone of Example 46, and following substantially the same procedure described therein, the compound 2-(6 - propionyl - 2 - naphthyloxy) - 2-methylpropionic acid is prepared.

Acidification of the sodium carbonate extract gives an 86% yield of solid product. Recrystallization from toluene yields pure 2-(6 - propionyl - 2 - naphthyloxy)-2-methylpropionic acid which melts at 131–132.5° C.

*Analysis for:* $C_{17}H_{18}O_4$.—Calculated: C, 71.31; H, 6.34. Found: C, 71.30; H, 6.32.

EXAMPLE 49

*(6-butyryl-2-naphthyloxy)acetic acid*

Aluminum chloride (49.5 g., 0.375 mole) is added to a well-stirred mixture of carbon disulfide (500 ml.), (2-naphthyloxy)acetic acid (25.0 g., 0.125 mole), n-butyryl chloride (15.0 g., 0.138 mole) and dimethylformamide (15 ml.) at 3° C. After all the aluminum chloride has been added, the mixture is allowed to stand at room temperature for one hour and it is then heated under reflux for three hours. The reaction is cooled and 500 ml. of a mixture of ice and 1 N hydrochloric acid is added and the mixture stirred for two hours. The resulting white solid which is in suspension is collected by filtration and washed with water. After purification by recrystallization from dipropyl ketone, 24 g. of pure (6-butyryl-2-naphthyloxy)acetic acid is obtained, M.P. 168–170° C.

*Analysis for:* $C_{16}H_{16}O_4$.—Calculated: C, 70.57; H, 5.92. Found: C, 70.28; H, 6.02.

EXAMPLE 50

*[4-(2-methylbutyryl)-1-naphthyloxy]acetic acid*

By substituting α-methylbutyryl chloride for the α-ethylbutyryl chloride of Example 12, and following substantially the same procedure described therein, the compound [4-(2-methylbutyryl) - 1 - naphthyloxy]acetic acid is prepared. Crystallization from a mixture of n-butyl chloride and hexane yields pure material melting at 95.5–97° C.

It will be apparent from the foregoing description that the alkanoyl substituted naphthyloxy-carboxylic acids of this invention constitute a valuable class of compounds which have not been prepared heretofore. One skilled in the art will also appreciate that the processes disclosed in the above examples are merely illustrative and are capable of wide variation and modification without departing from the spirit of this invention.

What is claimed is:

1. A compound of the formula:

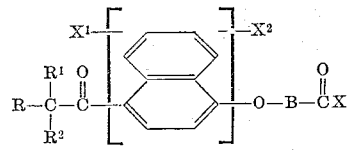

wherein B is a member selected from the group consisting of alkylene, alkarylene and arylene; R is a member selected from the group consisting of alkyl containing from one to six carbon atoms, trihalomethyl substituted alkyl, cycloalkyl, mononuclear aralkyl, mononuclear aryloxy, mononuclear arylthioalkyl, mononuclear aralkylthio and carboxyalkyl; $R^1$ and $R^2$ each represents a member selected from the group consisting of hydrogen, lower alkyl and, taken together, the $R^1$ and R radicals may be joined to form a cycloalkyl ring containing from five to six nuclear carbon atoms; X is a member selected from the group consisting of hydroxy, lower alkoxy and amido; and $X^1$ and $X^2$ each represents a member selected from the group consisting of hydrogen, halogen and lower alkyl.

2. A compound of the formula:

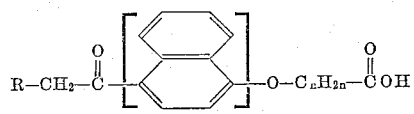

wherein R is lower alkyl and $n$ is an integer having a value of 1–5.

3. A compound of the formula:

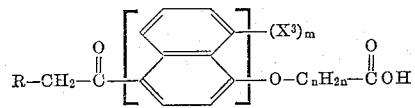

wherein R is lower alkyl; $X^3$ is halogen; $m$ is an integer having a value of 1–2; and $n$ is an integer having a value of 1–5.

4. A compound of the formula:

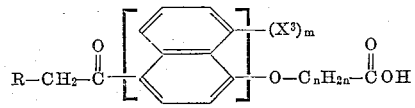

wherein R is lower alkyl; $X^3$ is lower alkyl; $m$ is an integer having a value of 1–2; and $n$ is an integer having a value of 1–5.

5. (2-chloro-4-butyryl-1-naphthyloxy)acetic acid.
6. (4-butyryl-1-naphthyloxy)acetic acid.
7. (4-butyryl-2-naphthyloxy)acetic acid.
8. (5-chloro-4-butyryl-1-naphthyloxy)acetic acid.
9. (4-butyryl-3-methyl-1-naphthyloxy)acetic acid.
10. (4-butyryl-5-methyl-1-naphthyloxy)acetic acid.
11. (6-methyl-4-butyryl-1-naphthyloxy)acetic acid.

References Cited

Thomas, "Aluminum Chloride in Organic Chemistry" (1941), pp. 271–273; 363–364.

Elsevier's Ency. Org. Chem., vol. 12B, Naphthalene Hydroxy Compounds, p. 1201.

LORRAINE A. WEINBERGER, *Primary Examiner.*

S. B. WILLIAMS, D. E. STENZEL, *Assistant Examiners.*